United States Patent
Knaappila

(10) Patent No.: US 10,859,689 B2
(45) Date of Patent: Dec. 8, 2020

(54) SYSTEMS AND METHODS FOR SELECTING OPERATING MODE BASED ON RELATIVE POSITION OF WIRELESS DEVICES

(71) Applicant: Silicon Laboratories Inc., Austin, TX (US)

(72) Inventor: Jere M. Knaappila, Evitskog (FI)

(73) Assignee: Silicon Laboratories Inc., Austin, TX (US)

( * ) Notice: Subject to any disclaimer, the term of this patent is extended or adjusted under 35 U.S.C. 154(b) by 202 days.

(21) Appl. No.: 16/145,592

(22) Filed: Sep. 28, 2018

(65) Prior Publication Data

US 2020/0103513 A1    Apr. 2, 2020

(51) Int. Cl.
| | |
|---|---|
| G01S 11/04 | (2006.01) |
| G01S 11/06 | (2006.01) |
| H04B 17/391 | (2015.01) |
| H04B 17/318 | (2015.01) |
| H04W 64/00 | (2009.01) |

(52) U.S. Cl.
CPC .............. *G01S 11/04* (2013.01); *G01S 11/06* (2013.01); *H04B 17/318* (2015.01); *H04B 17/3913* (2015.01); *H04W 64/006* (2013.01)

(58) Field of Classification Search
CPC . G01S 1/02; G01S 11/04; G01S 11/06; G01S 5/02; G01S 5/04; G01S 5/0009; H04B 17/38; H04W 64/00
USPC ....................................................... 342/450
See application file for complete search history.

(56) References Cited

U.S. PATENT DOCUMENTS

| | | |
|---|---|---|
| 4,405,832 A | 9/1983 | Soundermeyer |
| 5,148,180 A | 9/1992 | Beyer et al. |
| 8,723,729 B2 | 5/2014 | Desai et al. |
| 8,965,284 B2 | 2/2015 | Honkanen et al. |
| 9,354,292 B2 | 5/2016 | Burrell et al. |
| 9,503,841 B2 | 11/2016 | Knaappila |

(Continued)

OTHER PUBLICATIONS

Knaappila, "Systems and Methods for Adaptive Scanning and/or Advertising", U.S. Appl. No. 15/650,405, filed Jul. 14, 2017, SILA:551, 57 pgs.

(Continued)

*Primary Examiner* — Harry K Liu
(74) *Attorney, Agent, or Firm* — Egan Peterman Enders Huston

(57) ABSTRACT

Systems and methods are provided that may be implemented to configure and/or reconfigure device operating modes based on relative position of a wireless transmitter to a wireless receiver that is receiving a wireless radio frequency (RF) signal transmitted from the wireless transmitting device, or vice-versa. The relative position of a wireless transmitter to a wireless receiver may be determined using any suitable technique, e.g., using Time Difference of Arrival (TDOA) of a signal received at separate antenna elements of an antenna array of the wireless receiver, using Angle of Arrival (AoA) of a signal received at an antenna array of the wireless receiver, using measured received signal strength (e.g., received signal strength indicator (RSSI) or received signal decibel-milliwatts (dBm)) of a signal received at different antenna elements of an antenna array of the wireless receiver, using Angle of Departure (AoD) of a signal transmitted from an antenna array of the wireless transmitter, etc.

27 Claims, 11 Drawing Sheets

(56) References Cited

U.S. PATENT DOCUMENTS

| | | | |
|---|---|---|---|
| 2011/0143683 | A1 | 6/2011 | Sridhara et al. |
| 2013/0041648 | A1 | 2/2013 | Osman |
| 2014/0321321 | A1 | 10/2014 | Knaappila |
| 2015/0077051 | A1 | 3/2015 | Kim et al. |
| 2015/0271628 | A1 | 9/2015 | Knaappila |
| 2015/0319600 | A1 | 11/2015 | Knaappila |
| 2016/0112840 | A1 | 4/2016 | Drucker |
| 2016/0223640 | A1* | 8/2016 | Vilermo ............... G01S 5/0284 |
| 2018/0007523 | A1 | 1/2018 | Knaappila |
| 2018/0152917 | A1 | 5/2018 | Knaappila et al. |
| 2018/0176776 | A1* | 6/2018 | Knaappila ............... G06F 21/31 |
| 2019/0037419 | A1 | 1/2019 | Knaappila |
| 2020/0106496 | A1* | 4/2020 | Kagitapu ............. H04W 88/02 |

OTHER PUBLICATIONS

Knaappila, "Systems and Methods for Multiantenna Orientation and Direction Detection", U.S. Appl. No. 15/663,326, filed Jul. 28, 2017, SILA:550, 50 pgs.

Knaappila, "Systems and Methods for Modifying Information of Audio Data Based on One or more Radio Frequency (RF) Signal Reception and/or Transmission Characteristics", U.S. Appl. No. 16/145,652, filed Sep. 28, 2018, SILA:563, 74 pgs.

Lehtimaki, "Understanding Advanced Bluetooth Angle Estimation Techniques for Real-Time Locationing", Embedded World, Obtained from Internet May 14, 2018, 18 pgs.

Gunhardson, "Indoor Positioning Using Angle of Departure Information", 2015, 86 pgs.

Dhope, "Application of Music, Esprit and Root Music in DOA Estimation", University of Zagreb, 2010, 5 pgs.

Xiong et al., "SecureAngle: Improving Wireless Security Using Angle of Arrival Information", ACM, 2010, 6 pgs.

Gotsis et al., "Multiple Signal Direction of Arrival (DOA) Estimation for a Switched Beam System Using Neural Networks", Piers Online, vol. 3, No. 8, 2007, 5 pgs.

Gustafsson et al., "Positioning Using Time Difference of Arrival Measurements", Department of Electrical Engineering, Linkoping University, Publically available prior to Sep. 28, 2018 filing date of the current patent application, 4 pgs.

Wikipedia, "Stokes's Law of Sound Attenuation", Printed from Internet Aug. 2, 2018, 3 pgs.

Wikipedia, "Sound Localization", Printed from Internet Jul. 4, 2018, 8 pgs.

Michaelevsky et al., "PowerSpy: Location Tracking Using Mobile Device Power Analysis", Publically available prior to Sep. 28, 2018 filing date of the current patent application, 16 pgs.

Cnet, "Can You Handle the Truth? Everybody Loves the Sound of Distorted Music", Nov. 5, 2014, 2 pgs.

Healthy Hearing, Bluetooth Hearing Aids, May 1, 2018, 6 pgs.

* cited by examiner

SYSTEMS AND METHODS FOR SELECTING OPERATING MODE BASED ON RELATIVE POSITION OF WIRELESS DEVICES

FIELD

The disclosed systems and methods relate to wireless communication and, more particularly, to operating modes based on relative positioning of wireless devices.

BACKGROUND

Bluetooth Low Energy (BLE) relates to Bluetooth wireless radio technology. It has been designed for low-power and low latency applications for wireless devices within short range. Today, BLE applications can be found from healthcare, fitness, security, smart energy, industrial automation and home entertainment. However, BLE is not limited to only those, but increasingly more new application utilizing BLE technology are designed. Specifications for BLE are defined in Bluetooth 4.x (such as Bluetooth 4.0, 4.1, 4.2) and Bluetooth 5 core version specification by the Bluetooth Special Interest Group (SIG).

The difference between BLE and classic Bluetooth is that the BLE devices consume remarkably less power for communication than classic Bluetooth devices. In addition, the BLE is able to start the data transmission much quicker than the classic Bluetooth. This makes it possible to have BLE devices constantly on and to communicate intermittently with other devices.

In BLE technology, one or more so called slave devices can be connected to a master device. To let the master know about the slave devices before connection, the slave devices (or at that point "advertisers") periodically, at pseudo-random intervals, pass advertising packets which the master device (also known as scanner device, i.e. "scanner") is scanning. Depending on the type of advertising packet sent by an advertiser device, the scanner device may respond to the received advertising packet by requesting a connection with the advertiser device, or may respond by requesting further information from the advertiser device. Beacons are a particular type of BLE advertiser device that transmit advertising packets with a unique identifier to nearby portable electronic devices such as smart phones. An application on a portable electronic device may respond to information within an advertising packet received from a beacon by performing an action, such as approximating the location of the portable device. After an advertiser device and scanner device become connected as master and slave, the master device may request bonding with the slave device. This means that the devices exchange long term keys or other encryption info to be stored for future connections. In another case, the master device may request pairing with the slave device, in which case the connection may be encrypted only for the duration of the current connection, during which short term keys are exchanged between the master device and slave device.

BLE wireless signals have been employed to transmit multichannel audio data from a wireless transmitting device, such as a smart phone, to wireless audio reproduction device/s that decode the multichannel audio data from the BLE signal and reproduce the corresponding multichannel audio for a listener. Examples of such wireless audio reproduction devices include wireless stereo headphones, wireless stereo room speakers, and wireless home theater surround sound speakers.

SUMMARY

Disclosed herein are systems and methods that may be implemented in one exemplary embodiment to configure and/or reconfigure audio operating modes based on relative position of a wireless audio transmitter to a wireless audio receiver that is configured to receive a wireless audio signal transmitted from the wireless transmitter device, and to reproduce audio from the received wireless audio signal according to the configured operating mode. In this regard, the wireless audio signal may be a radio frequency (RF) signal that contains or otherwise conveys audio data (e.g., the audio data transmission may be inside the RF signal data transmission), and the wireless audio receiver may be configured to acoustically reproduce analog sound waves from the audio data conveyed by the received wireless audio signal according to the configured operating mode.

Using the disclosed systems and methods, the relative position of the wireless audio transmitter to the wireless audio receiver may be determined based on one or more signal reception or transmission characteristics of a radio frequency (RF) signal that is transmitted from the wireless audio transmitter to the wireless audio receiver (in which case the transmitted RF signal may or may not be the same as the wireless audio signal), or vice versa (in which case the transmitted RF signal is different than the wireless audio signal). In the latter case, the transmitted signal may be a non-audio RF signal (e.g., such as a dedicated non-audio RF measurement signal) that is transmitted from the wireless audio receiver to the wireless audio transmitter).

The relative position of a wireless audio transmitter to a wireless audio receiver may be determined based on signal reception or transmission characteristics using any suitable technique. Example techniques include signal reception characteristics such as Time Difference of Arrival (TDOA) of a signal received at separate antenna elements of an antenna array of the wireless audio receiver device, TOA of a RF signal received at one or more antenna elements of a wireless audio receiver device (e.g., including a RF signal received at a single antenna of an antenna array of a wireless audio receiver device that has an atomic clock or otherwise corrected clock that is synchronized with an atomic clock or similar accuracy clock of a wireless device that is transmitting the RF signal with transmission time information), Angle of Arrival (AoA) of a signal received at two or more antenna elements of an antenna array of the wireless audio receiver, using measured received signal strength (e.g., received signal strength indicator (RSSI) or received signal decibel-milliwatts (dBm)) of a signal received at different antenna elements of an antenna array of the wireless audio receiver, etc. Example techniques also include signal transmission characteristics such as using Angle of Departure (AoD) of a signal transmitted from an antenna array of the wireless audio transmitter.

Relative position between two wireless audio devices may also be similarly determined based on signal reception or transmission characteristics of a different measurement RF signal transmitted from a wireless audio receiver to a wireless audio transmitter separate from transmitting a wireless audio signal from the wireless audio transmitter to the wireless audio receiver. Examples of audio device operating modes that may be so configured or reconfigured include, but are not limited to, identity of received audio channel/s selected for reproduction by one or more given speaker/s (e.g., loudspeakers, room speaker/s, headphone speakers, hearing aid speakers, earphone speakers, etc.) and/or identity of transmitter selected for transmission of a given audio channel or audio channels.

Besides wireless audio devices, the disclosed systems and methods may be advantageously implemented to configure and reconfigure other types of non-audio operating modes, and in one exemplary embodiment for wireless audio and non-audio applications using portable wireless devices that are setup quickly in an ad-hoc manner. Moreover, besides audio applications, operating modes for any other types of applications (e.g., non-audio applications) having operating modes may be configured based on relative positioning (e.g., spatial positioning) of different wireless devices including, but not limited to, navigation lighting systems that include movable or repositionable lighting devices for marine vessels such as boats and ships. In one example of such an alternate embodiment, each individual wireless navigation lighting device of a marine lighting system may be mounted near a peripheral side (i.e., port or starboard side) or end (i.e., bow or stern) of a marine vessel and may be configured with a light source (e.g., light element such as LED or incandescent light bulb) that is controlled by circuitry in the device to emit a light having a color, intensity and/or blinking pattern that is based on the determined position of the lighting device on the vessel relative to another wireless device that acts as a reference point device of known location and orientation on the vessel. In one embodiment, the reference point device may optionally be a controlling device that transmits operating commands via RF signals to the individual lighting devices of the system, e.g., to control light color, light intensity, on/off operation, etc. for each lighting device, although one or more of these operations may be alternatively controlled by circuitry on each individual device itself.

In one example of the above embodiment, the reference point device may be positioned on the vessel's bridge or other location between the peripheral sides and ends of the vessel, and each individual lighting device may be controlled by its own circuitry or by the reference point device to emit a light having a color that is based on a determined position of the individual lighting device relative to the position of the reference point device (and thus to the sides/ends of the vessel), e.g., such that a starboard side mounted light device emits green light, a port side mounted lighting device emits red light, an aft mounted light emits white light, a forward mounted lighting device displays white, etc. It will be understood that operating modes for other types of vehicle lighting systems may be similarly selected to fit lighting protocols for the given situation, e.g., such lighting for vehicles such as trucks, trains, aircraft, spacecraft, etc.

In one embodiment, the disclosed systems and methods may be implemented to rapidly configure operating modes of audio devices, such as wireless headphones, hearing aids or stereo loud speakers that are receiving audio channel data from one or more wireless transmitters, e.g., using Bluetooth Low Energy (BLE) wireless signals. For example, the orientation with which a user is wearing a pair of wireless stereo headphones or pair of hearing aids may be detected, and the left and right stereo audio channels of the headphones or hearing aids automatically swapped in real time between the individual headphone or hearing aid speakers when necessary such that the left stereo channel is always output on the headphone or hearing aid speaker that is placed on the user's left ear, and such that the right stereo channel is always output on the headphone or hearing aid speaker that is placed on the user's right ear. In another example, placement of each of multiple wireless loudspeakers relative to a user's position may be detected, and which audio channel streamed to each given separate loudspeaker may be automatically selected based on this determined position of the given loudspeaker relative to the user's position.

In one embodiment, the disclosed systems and methods may be implemented using a two or more element antenna array that defines a center plane between the elements. The two or more element array may be employed on a wireless receiving device to detect from which side of the center plane a wireless radio frequency (RF) signal is being received from (e.g., based on TDOA of the wireless RF signal at the two or more antenna elements and/or based on a determination of AoA of the wireless RF signal at the two or more antenna elements), and thus which also represents the direction toward the transmitter of the signal. Knowing the direction to the wireless transmitter allows circuitry on the wireless receiving device to make one or more configuration decisions based on the direction to the transmitter of a wireless transmitting device. For example, a pair of wireless headphones or hearing aids may be equipped with an antenna array that defines a center plane that bisects the space between the two or more antenna elements of the array and that extends between the two respective headphones or hearing aids. Knowing which side of the plane from which an incoming signal is received allows left and right audio channels of an incoming wireless signal to be assigned to respective headphone or hearing aid speakers that correspond to the left and right ears of a user that is facing the transmitting device while the wireless signal is received. In another example, one or both of two separate wireless stereo loudspeaker systems may include a two or more element antenna array having a center plane that bisects the space between the two or more antenna elements of the array extending from the front to the back of a loudspeaker system. In this case, knowing which side of the center plane from which an incoming wireless signal is received at a given loudspeaker system from a wireless transmitter of a RF audio source (e.g., such as a recorded or streaming RF audio source) positioned between the two loudspeakers allows wireless signals corresponding to left and right audio channels to be assigned to respective wireless loudspeaker systems that are positioned to the left and right of the wireless transmitting device from which the wireless signal is received.

In another embodiment, the disclosed systems and methods may be implemented using a larger antenna array (i.e., having three or more antenna elements) to allow more accurate determination of the location (e.g., two-dimensional location) of a wireless signal transmitter relative to a wireless signal receiver device that includes the antenna array. Knowing the relative location of the wireless transmitter device allows circuitry on the wireless receiver device to make one or more configuration decisions based on the relative position of the wireless transmitter to a designated location, e.g., such as human listener. Such an implementation may be employed for more complicated configuration environments. For example, in a multi-speaker surround sound application, a receiving antenna array may be co-located with a wireless streaming audio source having known position relative to a human listener (or to a defined listening zone adjacent the audio source), and each of multiple loudspeaker systems of the surround sound system equipped with a transmitter and antenna that is configured to transmit a unique signal to the antenna array of the audio source. From the received unique signals, the location of each of the surround should loudspeaker systems may be determined relative to the surround sound audio source, and thus relative to the listener (or listening zone). Knowing the relative position of each surround sound speaker to the listener (or listening zone) in turn allows a different surround sound audio channel to be assigned to each given loudspeaker system.

In one respect, disclosed herein is a method, including: receiving a radio frequency (RF) signal at a first device, the RF signal being transmitted from a second device; measuring one or more RF signal reception or transmission characteristics of the received signal at the first device to determine at least one of position, orientation and/or direction of the first device relative to the second device; determining an operating mode for at least one of the first device or second device based on the determined position, orientation and/or direction of the first device relative to the second device; and implementing the determined operating mode by controlling operation of at least one of the first device or second device to implement the determined operating mode.

In another respect, disclosed herein is an apparatus, including at least one programmable integrated circuit coupled to radio circuitry of a first device, the programmable integrated circuit being programmed to operate the first device to: receive a radio frequency (RF) signal at the first device, the RF signal being transmitted from a second device; measure one or more RF signal reception or transmission characteristics of the received signal at the first device to determine at least one of position, orientation and/or direction of the first device relative to the second device; determine an operating mode for at least one of the first device or second device based on the determined position, orientation and/or direction of the first device relative to the second device; and implement the determined operating mode by controlling operation of the first device to implement the determined operating mode and/or transmitting a RF signal to the second device to cause the second device to implement the determined operating mode.

In another respect, disclosed herein is a system, including: a first device having at least one first programmable integrated circuit coupled to radio circuitry of the first device; a second device having at least one second programmable integrated circuit coupled to radio circuitry of the second device; where the second programmable integrated circuit of the second device is programmed to control operation of the second device to transmit a first RF signal from the second device to the first device. The first programmable integrated circuit of the first device may be programmed to operate the first device to: receive the first RF signal at the first device, measure one or more RF signal reception or transmission characteristics of the received first RF signal at the first device to determine at least one of position, orientation and/or direction of the first device relative to the second device, determine an operating mode for at least one of the first device or second device based on the determined position, orientation and/or direction of the first device relative to the second device, and implement the determined operating mode by controlling operation of the first device to implement the determined operating mode and/or transmitting a second RF signal from the first device to the second device to cause the second device to implement the determined operating mode.

DESCRIPTION OF ILLUSTRATIVE EMBODIMENTS

Figure 1:
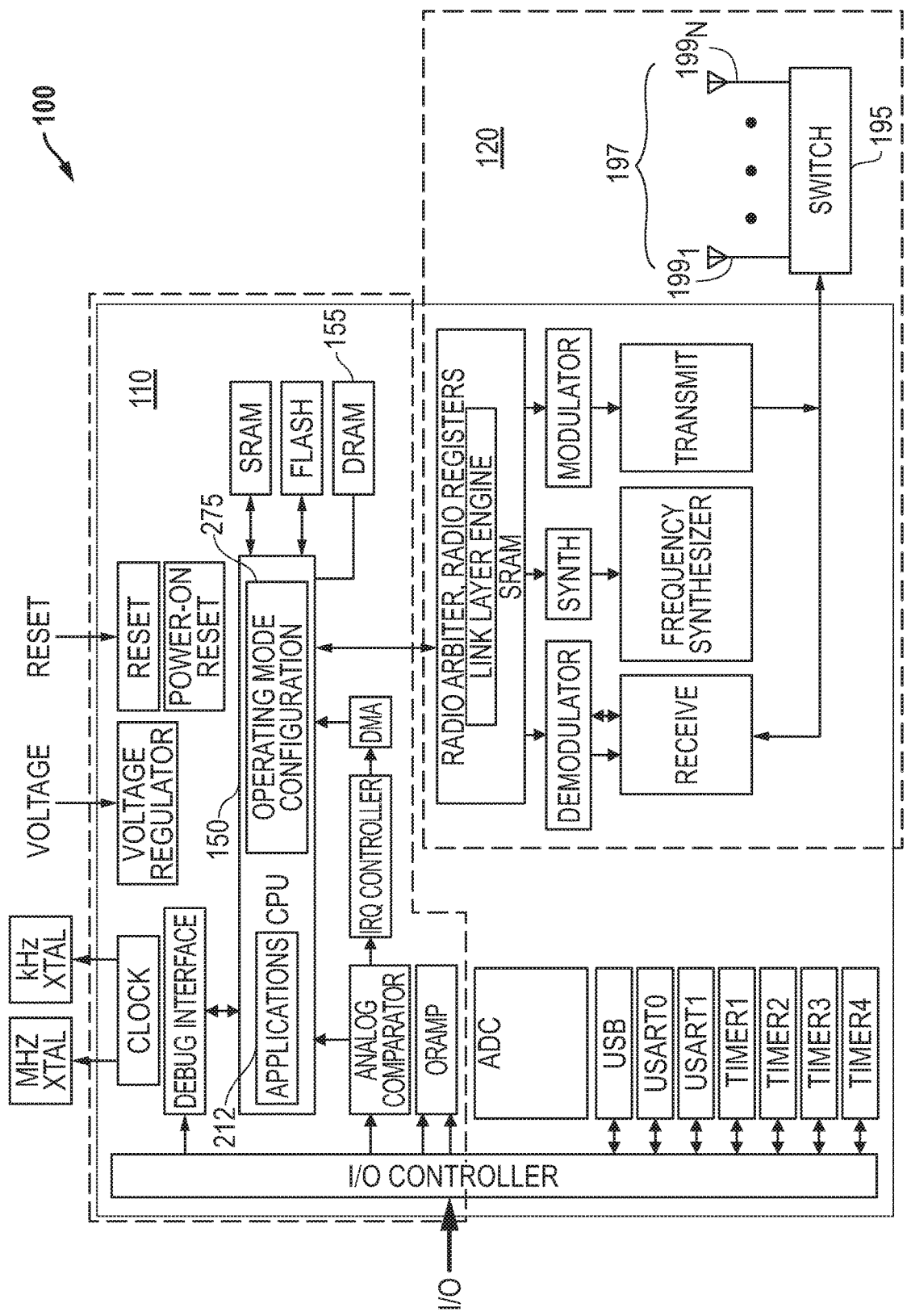
FIG. 1 illustrates a simplified block diagram of a wireless device according to one exemplary embodiment of the disclosed systems and methods.

FIG. 1 illustrates a simplified block diagram of an exemplary wireless device in the form of a BLE module 100 that may be employed to implement the disclosed systems and methods, it being understood that the disclosed systems and methods may be similarly implemented with other types of wireless technologies or protocols besides BLE (e.g., such as Zigbee or IEEE 802.15.4-based wireless technologies). In one exemplary embodiment, all components of BLE module 100 may be implemented as a system on a chip (SoC) or integrated circuit that includes one or more optional antenna array/s 197 and one or more optional antenna switch/es 195 to support side of arrival or angle of arrival detection as further described herein. In another exemplary embodiment, BLE module 100 may be implemented as a system on a chip (SoC) or integrated circuit that includes all components of BLE module 100 except optional antenna array/s 197 and external switch/es 195, which may be externally coupled to other components of BLE module 100.

As shown in FIG. 1, BLE module 100 includes a first module segment 110 that includes one or more central processing units (CPUs), processors or other programmable integrated circuits 150 and memory 155 (e.g., DRAM) with application data. Application/s 212 may be executed by CPU 150 to provide multiple different resources (e.g., such as different Bluetooth services, security manager, parts of a Bluetooth service such as Bluetooth service characteristics, and/or any other computing or wireless operation services) to other connecting radio frequency (RF)-enabled devices across different wireless RF connections (e.g., such as different BLE wireless connections between different BLE devices). CPU 150 may also be programmed to execute operating mode configuration logic 275 (e.g., as an application) as described further herein to configure and/or reconfigure operating modes, including non-radio operating modes (e.g., lighting operating mode, audio operating mode, etc.) of non-radio circuitry and/or non-radio-hardware (e.g., including circuitry and/or hardware that is external to BLE module 100 of any of the wireless devices) based on relative position of a wireless transmitter to a BLE module 100 that is receiving a wireless audio signal transmitted from the wireless transmitting device.

Still referring to FIG. 1, a second module segment 120 is configured to implement a part of a link layer and physical layer for radio module 100, and includes radio components and circuitry such as radio registers, link layer engine, modulator-demodulator, receiver and transmitter (transceiver), frequency synthesizer, balancing-unbalancing unit ("balun"), one or more antennas ("ant/s"). In one embodiment, second module segment 120 may include memory and one or more microcontrollers, processors, programmable logic devices (PLDs), or other programmable integrated circuits programmed or otherwise configured to execute one or more components of module segment 120, e.g., such as a link layer engine.

In one exemplary embodiment, the physical radio (RF) portion of module segment 120 may be optionally configured to determine a measurement of received signal strength such as received signal decibel-milliwatts (dBm) or Received Signal Strength Indicator (RSSI) in order to measure a power of the received radio signal. The received signal strength may be calculated from any packets in advertisement/broadcasting state or connected state. The determined received signal strength may also be used, e.g., for approximating the distance between two BLE devices. When a packet is received from another BLE device by BLE module 100, a RSSI value may be determined from it, and used for determining the distance between BLE module 100 and the BLE device by using known distance determination algorithms. In one embodiment, processing components of second module segment 120 may be programmed to determine direction of arrival and/or side of arrival of a signal received from another device (e.g., such as a BLE device) at separate individual antenna elements of an antenna array, i.e., with greater received signal strength being measured at the antenna element/s positioned closest to the transmitting device and weaker received signal strength measured at the antenna element/s positioned further away from the transmitting device, which thus allows relative distance from the signal source to be determined for each antenna element. Further information on RSSI determination and distance determination may be found, for example, in United States Patent Application Publication Number 2015/0271628, which is incorporated herein by reference in its entirety for all purposes.

In another exemplary embodiment, second module segment 120 may be additionally or alternatively configured to determine side of arrival or angle of arrival (AoA) of a signal received from another device (e.g., such as a BLE device). For example, two or more antenna elements $199_1$ to $199_N$ of second module segment 120 may be configured as a switched antenna array 197 or other suitable type of direction finding array that is coupled to integrated circuit components of second module 120 that are programmed to determine side of arrival or AoA of a signal received from another device by measuring amplitude and/or phase of the signal at each antenna element 199 in the antenna array 197, for example, as described in United States Patent Application Publication Number 2018/0176776 and in U.S. patent application Ser. No. 15/663,326 filed on Jul. 28, 2017, each of which is incorporated herein by reference in its entirety for all purposes. In one embodiment, side of arrival or angle of arrival (AoA) of a signal received from another device may be so determined using only a single antenna array 197 having multiple antenna elements 199, and in another exemplary embodiment processing components of second module 120 may be programmed to determine side of arrival or AoA of a signal received from another device based on a determined angle of departure (AoD) of the received signal from another BLE device as described in United States Patent Application Publication Number 2018/0176776 and in U.S. patent application Ser. No. 15/663,326 filed on Jul. 28, 2017, each of which is incorporated herein by reference in its entirety for all purposes.

In one embodiment the one or more programmable integrated circuits, memory, and clock circuitry of module segment 110 may be coupled to each other and to components of module segment 120 through a system bus interconnect or one or more other types of suitable communication media, including one or more electrical buses and/or intervening circuitry that provides electrical communications. In certain embodiments, memory of module segments 110 and 120 may contain instructions which, when executed by programmable integrated circuits of BLE module 100, enable the BLE module 100 to operate as a BLE device to perform the functions described herein. Memory of BLE module 100 may be implemented, for example, using one or more non-volatile memories (e.g., FLASH read-only-memories (ROMs), electrically programmable ROM (EPROMs), and/or other non-volatile memory devices) and/or one or more volatile memories (e.g., dynamic random access memories (DRAMs), static random access memories (SRAM) and/or other volatile memory devices).

Second module segment 120 includes circuitry that operates as a wireless interface for first module segment 110 and that is coupled to one or more antennas as shown. Second module segment 120 may include a radio that includes baseband processing, MAC (media access control) level processing, beamforming or TDOA processing, and/or other physical layer processing for BLE packet communications. The programmable integrated circuits of first module segment 110 and second module segment 120 may also read and write from the various system memory during operations, for example, to store packet information being received from or transmitted to another BLE device. Although not shown, BLE module 120 may also be coupled receive power from a power supply, which may be a battery or a connection to a permanent power source such as a AC mains wall outlet.

Figure 2A:
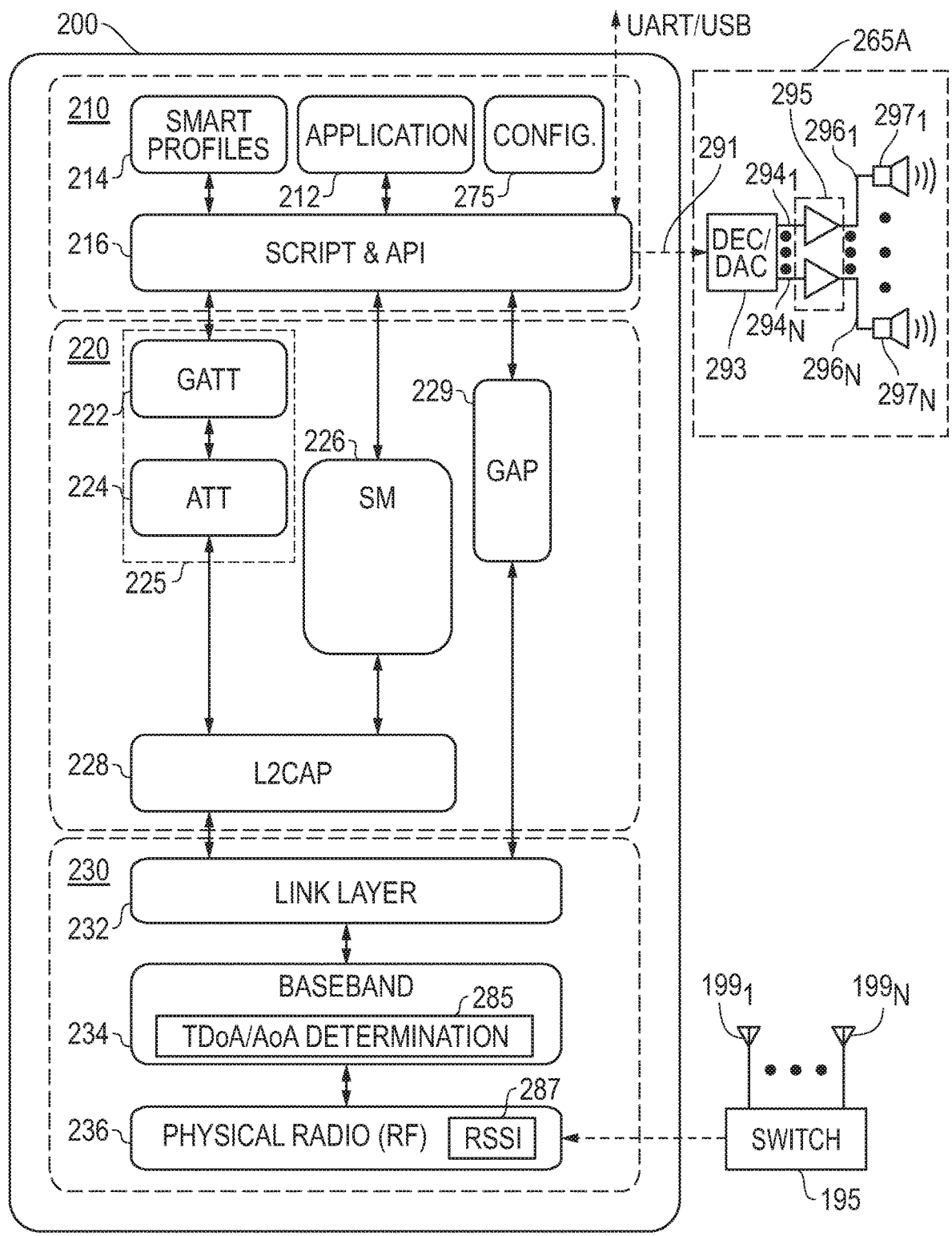
FIG. 2A is a simplified illustration of components of a Bluetooth smart module according to one exemplary embodiment of the disclosed systems and methods.
Figure 2B:
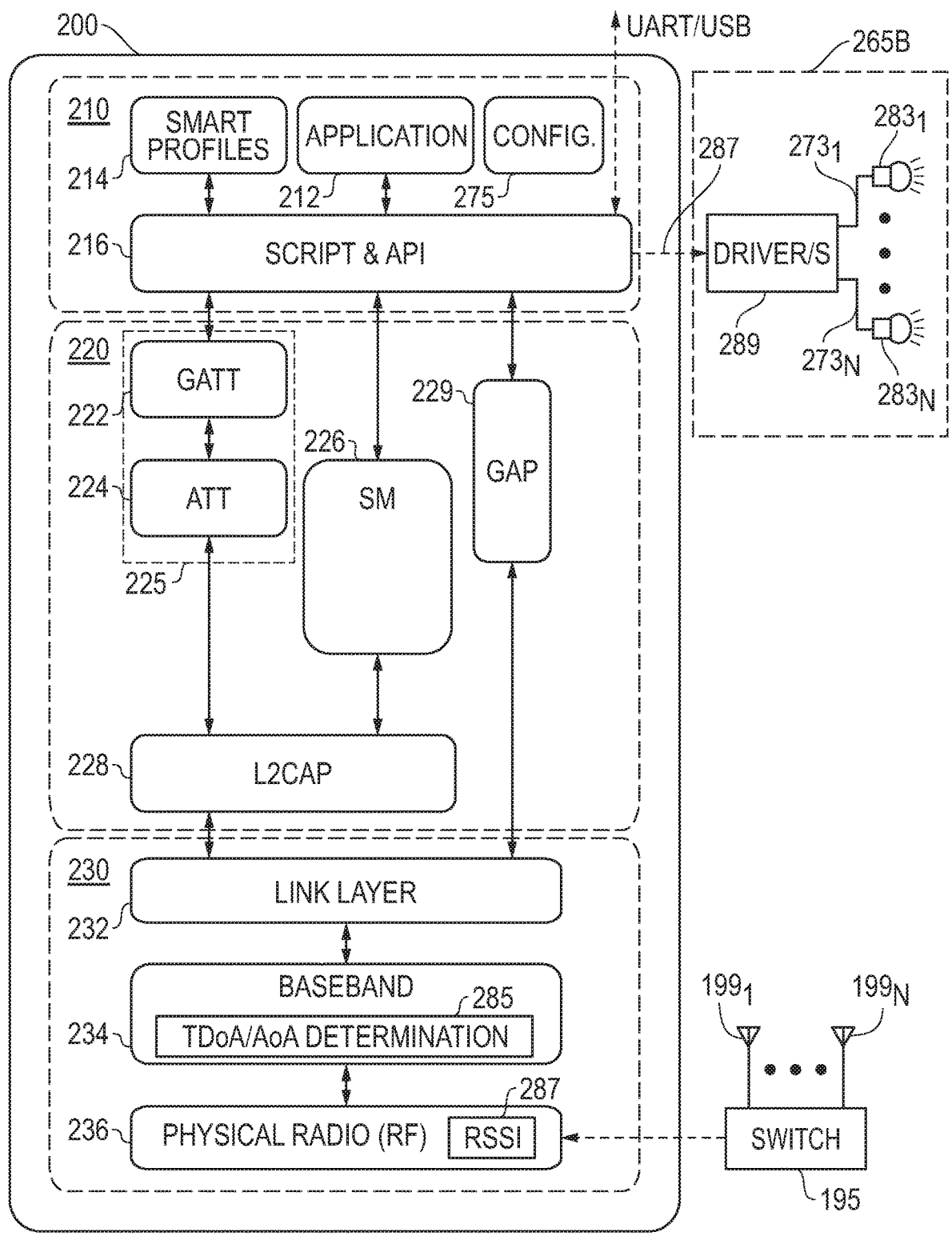
FIG. 2B is a simplified illustration of components of a Bluetooth smart module according to one exemplary embodiment of the disclosed systems and methods.

FIG. 2A is a simplified illustration of application, host and BLE control components of a Bluetooth smart module 200 configured and coupled to audio-related external non-radio circuitry and/or hardware 265A according to one exemplary embodiment of the disclosed systems and methods. Components of Bluetooth smart module 200 may be implemented, for example, using the hardware components of radio module 100 or any other suitable combination of radio hardware components. FIG. 2B is a simplified illustration of application, host and BLE control components of a Bluetooth smart module 200 configured and coupled to lighting-related external non-radio circuitry and/or hardware 265B according to one exemplary embodiment of the disclosed systems and methods.

As shown in FIGS. 2A and 2B, Bluetooth smart module 200 of these embodiments includes application layer 210, host layer 220 and a Bluetooth (or BLE) controller 230. Application layer 210 may include, for example, apparatus-related application/s 212 (e.g., heart rate, proximity, blood pressure, time update, temperature, battery, lighting control, home automation control, audio reproduction and output control, audio creation and input control, etc.), smart profiles 214, and script and application programming interface (API) 216. Host layer 220 includes protocols running over the connection.

Other examples of application/s 212 include, but are not limited to, apparatus-related applications, such as a wireless RF audio transmitter application for transmitting RF signals containing or otherwise conveying streaming (e.g., Internet) and/or locally stored audio data for reproduction at a remote audio receiver, audio output application for locally reproducing multiple channels of received RF audio at a wireless audio receiver (e.g., such as headphone or hearing aid system, loudspeaker system, etc.), vehicle lighting system control application for transmitting RF control signals to individual lighting devices of the vehicle lighting system, local light source control application executing at each individual lighting device for controlling local light driver circuitry to control colors, intensity, etc. of its respective coupled light source, etc. Host layer 220 also includes data to be used in advertisement profile or Generic Attribute Profile (GATT) 222, generic access profile (GAP) 229, attribute protocol (ATT) 224, security manager (SM) 226 and logical link control and adaptation protocol (L2CAP) 228. Together GATT 222 and ATT 224 provide services 225 for Bluetooth smart module 200 that define an interface with other BLE devices connected to Bluetooth smart module 200 for reading and/or writing data for applications 212.

In one embodiment, application layer 210 of FIG. 2A may be capable of generating multiple channel audio data (e.g., from digital audio file, streaming audio channels received across a network connection such as the Internet, etc.), and providing the multiple channel audio channel data to host layer 220 for transmission using Bluetooth (or BLE) controller 230 from Bluetooth smart module 200 of a first BLE-enabled wireless device to one or more other BLE-enabled wireless devices across one or more BLE connections. In another embodiment, application layer 210 of Bluetooth smart module 200 may be capable of receiving multiple channel audio data through host layer 220 and BLE controller 230 at a first BLE-enabled wireless device from a second BLE-enabled wireless device across a BLE connection. In the latter case, operating mode configuration logic 275 may also be present as shown to configure the received multiple audio channel data for analog audio reproduction by assigning the data of one or more of the audio channels to one or more respective analog audio output channels based on relative position of the transmitting second BLE-enabled wireless device to the receiving first wireless device. Operating mode configuration logic 275 may be executed separate from application layer 212 as shown, or may alternatively be executed by application layer 212 or using any other suitable data processing configuration. As described further herein, assigned audio output channel data 291 may be provided to non-radio circuitry and/or non-radio hardware 265A that includes an audio decoder (DEC) or digital-to-analog converter (DAC) 293 where it is converted to one or more analog audio output signals $294_1$ to $294_N$ (depending on the application), amplified by amplifier circuitry 295, and provided as separate amplified audio output channels $296_1$ to $296_N$ to one or more respective speakers $297_1$ to $297_N$ that may be integrated or otherwise co-located with the first BLE-enabled wireless device.

In addition to (or as an alternative to) audio generation or reproduction capability, application layer 210 of FIG. 2A may be configured to perform other tasks or functions, and configure operating mode of same. For example, application layer 210 capable of reading sensor data (e.g., from heart rate sensor, proximity sensor, temperature sensor, etc.), and reporting the data to host layer 220 for transmission using Bluetooth (or BLE) controller 230 from Bluetooth smart module 200 to one or more other receiving BLE-enabled devices across one or more connections.

In another embodiment, application layer 210 of Bluetooth smart module 200 may be additionally or alternatively capable of exchanging (receiving or transmitting) data, control and/or configuration information through host layer 220 and BLE controller 230 with other BLE-enabled devices across one or more connections. In such other configurations, operating mode configuration logic 275 may be present to configure the operating mode of any one or more other such functions or tasks based on relative position of a transmitting BLE-enabled wireless device to a receiving BLE-enabled wireless device. Examples of other types of operating modes that may be so configured include, but are not limited to, determination of lighting colors for individual wireless devices of a navigation lighting system that includes movable or repositionable lighting devices for marine vessels such as boats and ships. For example, FIG. 2B illustrates an alternate embodiment in which application layer 210 of FIG. 2B may be capable of providing light control data 287 (e.g., via general purpose input/output (GPIO) output signals, Serial Peripheral Interface (SPI) bus, I2C bus signals, etc.) to non-radio circuitry and/or hardware 265B that may include, for example, light driver/s 289 (e.g., red-green-blue "RGB" LED light driver chip) and one or more light elements $283_1$ to $283_N$ that may be integrated or otherwise co-located with a BLE-enabled wireless device. Light driver/s 289 may be coupled via respective wire conductors $273_1$ to $273_N$ to drive the one or more light elements $283_1$ to $283_N$ based on the light control data 287, e.g., to cause each light element to emit a particular color, intensity, blinking pattern, etc.

As further shown in FIGS. 2A and 2B, Bluetooth (or BLE) controller 230 also includes link layer 232, baseband 234, and physical layer 236 (i.e., physical radio, radio frequency RF). Link layer 232 is present to provide ultra-low power idle mode operation and device (i.e., connection mode and advertising mode handling). Link layer 232 is also configured to control packet transmission and response. Link layer 232 may be configured to support one or more connections or may in one embodiment be configured with multiple virtual link layers that are simultaneously operating, and a scheduler that is configured to control access of the virtual link layers to common radio resources of physical layer 236 through baseband 234 in a manner described in United States Patent Application Publication Number 20180049106, which is incorporated herein by reference in its entirety for all purposes.

In one exemplary embodiment, processing components of second module 120 of FIG. 1 may implement demodulator or receiver component of baseband processor 234 of FIGS. 2A and 2B, and to sample a received signal. Processing components of first module 110 may be programmed to execute an application or other suitable programmed logic to perform operating mode configuration logic 275 of FIGS. 2A and 2B using sampled information provided by processing components of first module 110. In this regard, operating mode configuration logic 275 may be executed to measure and/or process one or more signal reception and/or transmission characteristics of network signals received by BLE module 100 of FIG. 1 from one or more other BLE devices. Such signal reception and/or transmission characteristics may include any characteristic of a signal received at a given BLE module 100 that is indicative of a direction from which the signal is received at BLE module 100 and/or that is indicative of a spatial location of a device that transmitted the received signal to BLE module 100. Specific examples of such signal reception and/or transmission characteristics but are not limited to, time difference of arrival (TDOA), Angle of Arrival (AoA), Angle of Departure (AoD), etc. Further information on such signal reception and/or transmission characteristics, and examples thereof, may be found in United States Patent Application Publication Number 20180176776, in U.S. patent application Ser. No. 15/664, 539 filed Jul. 31, 2017, and in U.S. patent application Ser. No. 15/663,326 filed Jul. 28, 2017, each of which is incorporated herein by reference in its entirety for all purposes.

For example, TDOA and/or AoA of a received signal may be determined by TDOA/AoA determination logic 285 using any suitable technique, e.g., such as by using time difference of arrival (TDOA) techniques to measure the delay and/or or by measuring difference in received phase, of the received signal at each antenna element $199_1$ to $199_N$ in the antenna array 197 relative to another antenna element/s 199 in the antenna array 197 and which may include, for example, using switch 195 of FIG. 1 to switch through the different elements 199 of the array. At least a portion of such a received signal may be constant frequency to aid measurement of phase shift or TDOA between antenna elements of the array. In some embodiments direction of arrival (DOA) processing techniques such as MUltiple Signal Classification (MUSIC), Estimation of Signal Parameters Via Rotational Invariance Techniques (ESPRIT), etc. may be employed depending on the particular system configuration. It will be understood that in one embodiment, phase shift of a received signal may be performed by demodulator or receiver of baseband processor 234, and this determined phase shift information then passed upwards to a higher layer of BLE module 100 for AoA determination. In one embodiment, TDOA/AoA determination logic 285 may also be programmed to determine AoD or other signal transmission characteristics, or TDOA/AoA determination logic 285 may be replaced by suitable logic that only determines TDOA, AoD or other signal transmission characteristic/s. In another alternate embodiment, TDOA, AoA, and/or AoD may be determined by CPU 150 of first module 110 of FIG. 1, e.g., as an application/s executing in application layer 200 of FIG. 2A or 2B.

It will be understood that functionality of operating mode configuration logic 275 may be executed by one or more processing devices of BLE module 100, e.g., such as using one or more processing device/s of first module 110, one or more processing device/s of second module 120, and/or combinations of processing device/s of first module 110 and second module 120.

Figure 3A:
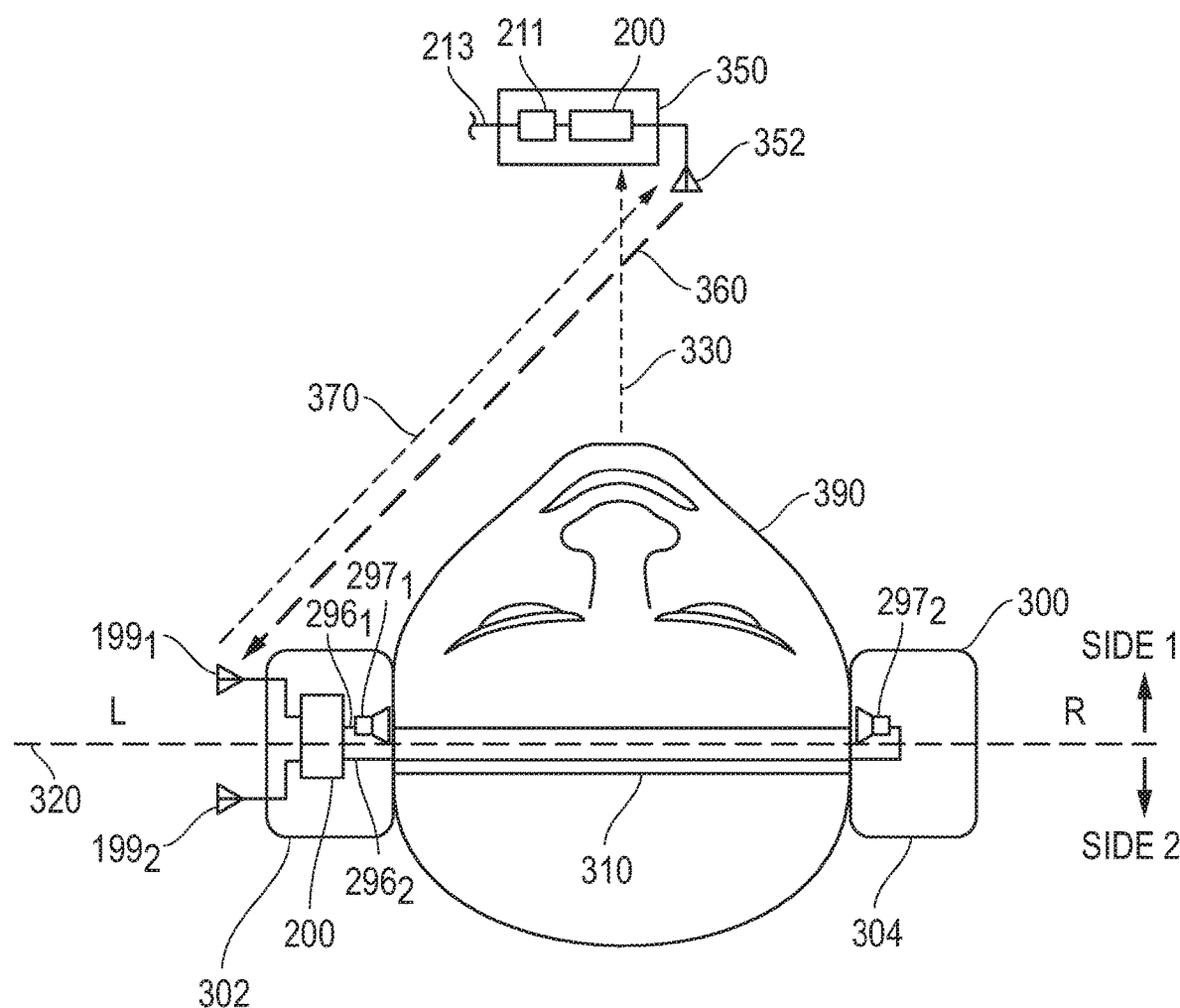
FIG. 3A illustrates an overhead view of audio operating mode configuration according to one exemplary embodiment of the disclosed systems and methods.

FIG. 3A illustrates an overhead view of one exemplary embodiment of audio operating mode configuration. In this embodiment, a human user 390 is facing a wireless audio source 350 and wearing a stereo audio headphone system 300 (e.g., a battery powered headphone system) that includes a first headphone 302 having an integrated first speaker $297_1$ worn adjacent the user's left ear and with a second headphone 304 having an integrated second speaker $297_2$ worn adjacent the user's right ear. In this embodiment, first headphone 302 is coupled to second headphone 304 by a headband 310 that operates to hold first headphone 302 and second headphone 304 of headphone system 300 together on the user's head such that the user may simultaneously listen to a first audio channel $296_1$ that is reproduced as analog acoustic sound waves to the user's left ear by first speaker $297_1$ and a second audio channel $296_2$ that is reproduced as analog acoustic sound waves to the user's right ear by second speaker $297_2$. It will be understood that a headphone system may be alternately configured in any other suitable manner, e.g., such as with in-ear speakers or hearing aid devices that are linked together by electrical conductors and do not require a headband, or linked together by wireless signal connection that do not require a headband and/or electrical conductor extending therebetween, such as described in U.S. patent application Ser. No. 16/145,652 entitled "SYSTEMS AND METHODS FOR MODIFYING INFORMATION OF AUDIO DATA BASED ON ONE OR MORE RADIO FREQUENCY (RF) SIGNAL RECEPTION AND/OR TRANSMISSION CHARACTERISTICS" by Jere M. Knaappila, which is filed concurrently herewith on the same day as the present patent application, and which is incorporated herein by reference in its entirety for all purposes. In this regard, operating mode selection may be implemented for wireless in-ear speaker systems and wireless hearing aid systems in the same manner as described herein for wireless headphone systems.

Also in this embodiment, a Bluetooth smart module 200 executing operating mode configuration logic 275 is integrated with headphone 302, and is coupled to a two-element antenna array that includes antenna elements $199_1$ and $199_2$ to receive a BLE radio frequency (RF) signal 360, although more than two antenna elements 199 may be employed in some embodiments. In this embodiment signal 360 conveys stereo audio channel data that is transmitted from antenna 352 by smart module 200 of audio source 350, e.g., such as a smart phone, tablet computer, notebook computer, virtual assistant device, music player like a turntable or FM receiver or MP3 player, television set top box, etc. Although not illustrated in FIG. 3A, a wireless receiver device such as stereo audio headphone system 300 may include at least one antenna array having three or more antenna elements. In this regard, an antenna array having two or more antenna elements 199 may be employed to determine signal direction relative to a single axis (e.g., such as left/right of a user relative to reference vector 330 or front/back of a user relative to an array center plane 320), while an antenna array having three or more antenna elements that are not arranged relative to each other in a single line may be employed to determine signal direction angle (e.g., signal direction angle through a full 180 degree or other range of possible angles relative to a given axis. Thus, where the Figures illustrate two antenna elements $199_1$ and $199_2$ in the Figures herein, it will be understood that three or more antenna elements 199 may be similarly provided in non-aligned relationship where determination of angle relative to defined axis or vector is desired to be performed.

Still referring to FIG. 3A, audio source 350 may also include other optional audio circuitry 211 which may include, for example, internal non-volatile memory (NVM) storing audio files, network interface controller, one or more programmable integrated circuits configured to generate audio from internal NVM audio files and/or from external streaming or wireless audio files/data received from an optional external wired or wireless connection 213 (e.g., 802.11 Wi-Fi, wireless cellular, connection to external NVM, etc.), etc. For simplicity of illustration, not shown in FIG. 3A is switch circuitry 195 of FIGS. 1 and 2 that may be coupled between headphone system smart module 200 and each of at least two antenna elements $199_1$ and $199_2$ as shown in FIGS. 1 and 2. For the same reason, also not shown in FIG. 3A are DEC/DAC circuitry 293 and amplifier circuitry 295 that may be coupled between headphone system smart module 200 and each of speakers $297_1$ and $297_2$ as shown in FIGS. 1 and 2.

As shown in FIG. 3A, headphone system antenna elements $199_1$ and $199_2$ are positioned on either side of an array center plane 320 that in this case extends between and through the respective bodies of headphones 302 and 304 (which may alternatively be in-ear hearing aids), with one planar side facing audio source 350. In this exemplary embodiment, array center plane 320 is also oriented perpendicular to a vector 330 that extends forward from front of user 390 toward the audio source 350 such that antenna element $199_1$ is positioned closer to audio source 350 than is antenna element $199_2$, with array center plane 320 positioned between antenna elements $199_1$ and $199_2$. This allows smart module 200 to measure the strength, time and/or phase of arrival of signal 360 at each of antenna elements $199_1$ and $199_2$ to determine which side (side 1 or 2) of center plane 320 first receives signal 360, e.g., based on measured received signal strength, TDOA and/or AoA as described further herein. In this regard, signal 360 arrives first and with greatest strength at the antenna element 199 corresponding to the side of center plane 320 that faces audio source 350, i.e., which is side "1" corresponding to antenna element $199_1$ when headphone system 300 is oriented in the position shown in FIG. 3A. Knowing that side "1" faces the audio source 350 when audio source 350 is positioned in front of the user 310 allows operating mode configuration logic 275 to determine that headphone system 300 is being worn with headphone 302 positioned adjacent the user's left ear and with headphone 304 positioned adjacent the user's right ear as shown in FIG. 3A.

Operating mode configuration logic 275 of headphone system smart module 200 may respond to determination of headphone system orientation by causing output of left stereo channel audio from the received stereo signal 360 on first analog audio channel $296_1$ to speaker $297_1$ and output of right stereo channel audio from the received stereo signal 360 on second analog audio channel $296_2$ to speaker $297_2$. In one exemplary embodiment, operating mode configuration logic 275 may implement a temporarily operating configuration calibration mode (e.g., for 10 to 30 seconds or other suitable greater or lesser time duration after a BLE connection is established between audio source 350 and headphone system 300) when each wireless audio streaming session from audio source 350 is first started. During the temporary operating configuration calibration mode headphone system orientation is determined and left and right audio channel assignment is made to the headphone speakers $297_1$ and $297_2$. The determined left and right audio channel assignment may then be locked in after the temporary operating configuration calibration mode expires, e.g., allowing the user 380 to move the audio source 350 to another location such as a user's pocket or a desktop without affecting the audio channel assignment to headphone speakers $297_1$ and $297_2$.

Figure 3B:
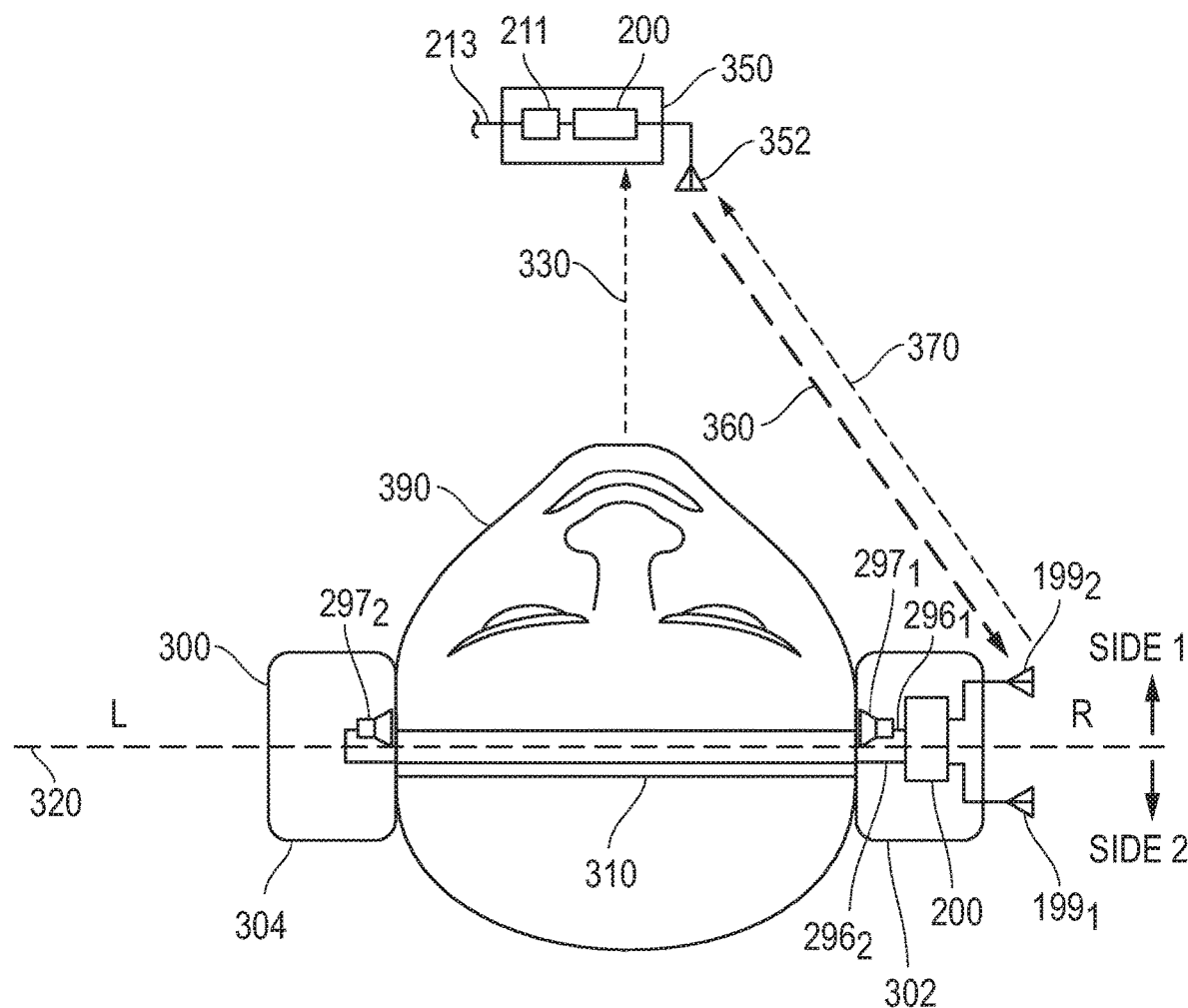
FIG. 3B illustrates an overhead view of audio operating mode configuration according to one exemplary embodiment of the disclosed systems and methods.

FIG. 3B illustrates an overhead view of a human user 390 that is wearing the same stereo audio headphone system 300 of FIG. 3A, but this time with first headphone 302 and integrated first speaker $297_1$ worn adjacent the user's right ear and with a second headphone 304 and integrated second speaker $297_2$ worn adjacent the user's left ear. With headphone system 300 worn in this position, side 2 of array center plane 320 faces audio source 350 so that antenna element $199_2$ is positioned closer to audio source 350 than is antenna element $199_1$. As with FIG. 3A, measurement of the arrival of signal 360 at each of antenna elements $199_1$ and $199_2$ may be used in FIG. 3B to determine which side ("1" or "2") of array center plane 320 first receives signal 360 and/or receives signal 360 with the greatest signal strength. In FIG. 3B, signal 360 arrives first at antenna element $199_2$ corresponding to side "2" of center plane 320 that faces audio source 350 when headphone system 300 is oriented in the position shown in FIG. 3B. Knowing that side "2" of center plane 320 faces the audio source 350 when audio source 350 is positioned in front of the user 310 allows operating mode configuration logic 275 to determine that headphone system 300 is being worn with headphone 304 positioned adjacent the user's left ear and with headphone 302 positioned adjacent the user's right ear as shown in FIG. 3B.

Operating mode configuration logic 275 of headphone system smart module 200 may respond to the above-described determination of headphone system orientation by causing output of right stereo channel audio from the received stereo signal 360 on first analog audio channel $296_1$ to speaker $297_1$ and causing output of left stereo channel audio from the received stereo signal 360 on second analog audio channel $296_2$ to speaker $297_2$. Thus, in this way operating mode configuration logic 275 of headphone system 300 may automatically select output of each of the left and right stereo audio channels to the correct analog audio channel $296_1$ or $296_2$ such that the left stereo channel is always played on the speaker 297 positioned adjacent the user's left ear and such that the right stereo channel is always played on the speaker 297 positioned adjacent the user's right ear, regardless of which orientation the headphone system 300 is worn by user 390.

It will be understood that it is not necessary that array center plane 320 be oriented perpendicular to vector 330 of FIGS. 3A and 3B as long as one of multiple antenna elements 199 (e.g., one of antenna elements $199_1$ or $199_2$) is positioned closer to audio source 350 than is the other antenna element/s 199 (e.g., $199_1$ or $199_2$) when headphone system 300 is worn by the user 390 so as to allow measurement of the time of arrival (TOA) of signal 360 first and/or with greatest strength at the side of center plane 320 corresponding to the closest antenna element (e.g., antenna element $199_1$ in the illustrated case) to audio source 350. It will also be understood that BLE module 200 and antenna elements $199_1$ and $199_2$ may be alternately positioned at other locations on headphone system 300, e.g., including at second headphone 304, on headband 310, etc.

In an alternate embodiment, angle of departure (AoD) techniques may be used to determine orientation of headphone system 300 of FIGS. 3A and 3B on the head of human user 390, and then operating mode configuration of stereo audio channels may be selected based on this determined headphone system orientation, e.g., when each wireless streaming music session from audio source 350 is first started. In such an alternate embodiment, smart module 200 of headphone system 300 may first operate during a temporary operating configuration calibration mode (e.g., 10 to 30 seconds or other suitable greater or lesser time duration after a BLE connection is established) to transmit a BLE RF measurement signal 370 (e.g., such as a non-audio RF signal that does not contain or otherwise convey audio data or information) that is separate from BLE signal 360. During the temporary calibration mode, the BLE orientation signal may be transmitted from each of antenna elements $199_1$ and $199_2$ using a switching pattern or sequence that is implemented by an array switch 195 (shown in FIGS. 1 and 2) to selected between antenna elements $199_1$ and $199_2$ to transmit the measurement signal 370 one element at a time to audio source 350. Smart module 200 of audio source 350 may operate in receive mode to receive the measurement signal 370 from antenna elements $199_1$ and $199_2$.

In the above alternate (AoD) embodiment, smart module 200 of audio source 350 may determine AoD and also execute operating mode configuration logic 275 to determine orientation of headphone system 300 based on the received measurement signal 370. For example, at least a portion (e.g., at the end of a BLE packet or any other part of the signal) of the measurement signal 370 may be transmitted by headphone system 300 with a constant frequency and using each of the two antenna elements $199_1$ and $199_2$ to transmit one at time during the constant frequency portion of the signal. This results in a phase shift of the measurement signal 370 as it is received from $199_1$ and $199_2$ at the antenna element 352 of audio source 350, and from which AoD may be determined by receiving device 302. AoD of the measurement signal transmitted from headphone system 300 may then be calculated based on the measured phase shift of the measurement signal 370 that occurs during transmission from antenna elements $199_1$ and $199_2$, e.g., using similar algorithm previously described to determine AoA. The antenna element $199_1$ or $199_2$ that is oriented closest to audio source 350 corresponds to the side ("1" or "2") of measurement plane 320 of headphone system 300 that faces audio source 350 and from which the measurement signal 370 departs headphone system 300. This side may be determined from the AoD by smart module 200 of audio source 350, and will be determined as side "1" in FIG. 3A and side "2 in FIG. 3B.

Once the side of departure of the measurement signal 370 from headphone system 300 is determined (corresponding to the side facing audio source 350), operating mode configuration logic 275 executing on smart module 200 of audio source 350 may then configure the operating mode of headphone system 300 (e.g., by assigning left and right stereo audio channels to individual speakers $297_1$ and $297_2$) based on the determined orientation of headphone system 300. Audio source 350 may control operating mode of headphone system 300 by, for example, swapping left and right audio channels in the audio stream transferred to headphones 302 and 304, or by configuring the headphone system 300 to swap left-right channels. Smart module 200 of audio source 350 may then operate in transmit mode to transmit the BLE signal 360 conveying stereo audio channel data from antenna 352 to smart module 200 of headphone system 300 via antenna elements $199_1$ of $199_2$. Now operating in receive mode, smart module 200 of headphone system 300 may then automatically select to output each of the left and right stereo audio channels to the correct analog audio channel $296_1$ or $296_2$ such that the left stereo channel is always played on the speaker 297 positioned adjacent the user's left ear and such that the right stereo channel is always played on the speaker 297 positioned adjacent the user's right ear in similar manner descried in relation to FIGS. 3A and 3B.

Figure 4A:
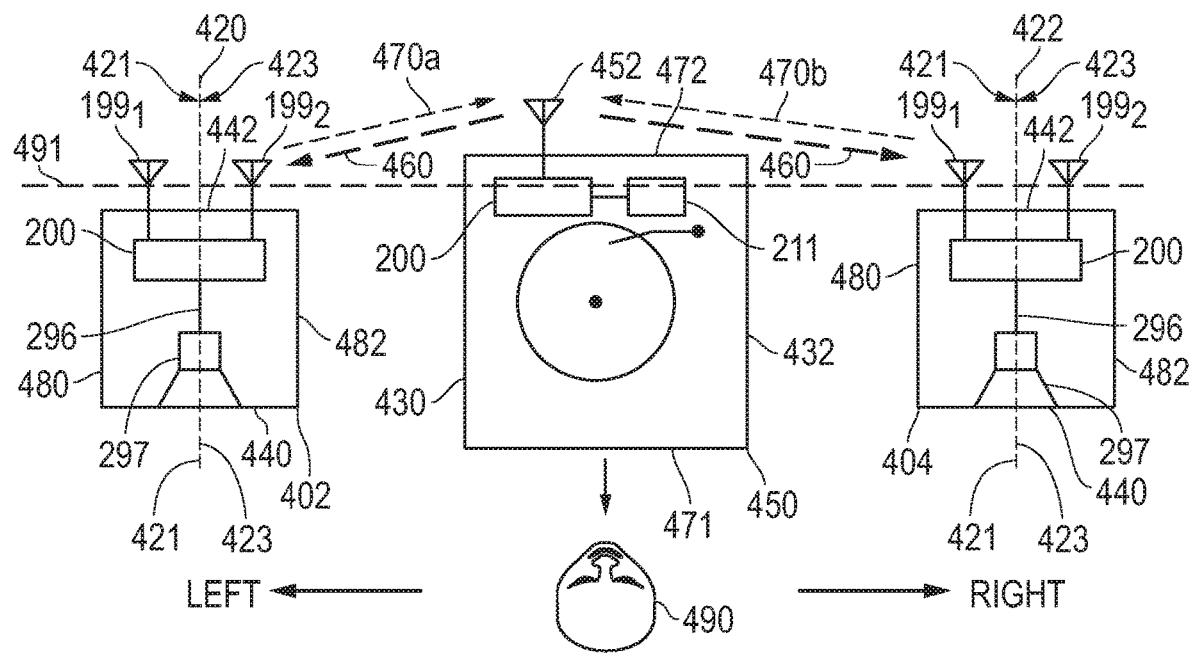
FIG. 4A illustrates an overhead view of audio operating mode configuration according to one exemplary embodiment of the disclosed systems and methods.
Figure 4C:
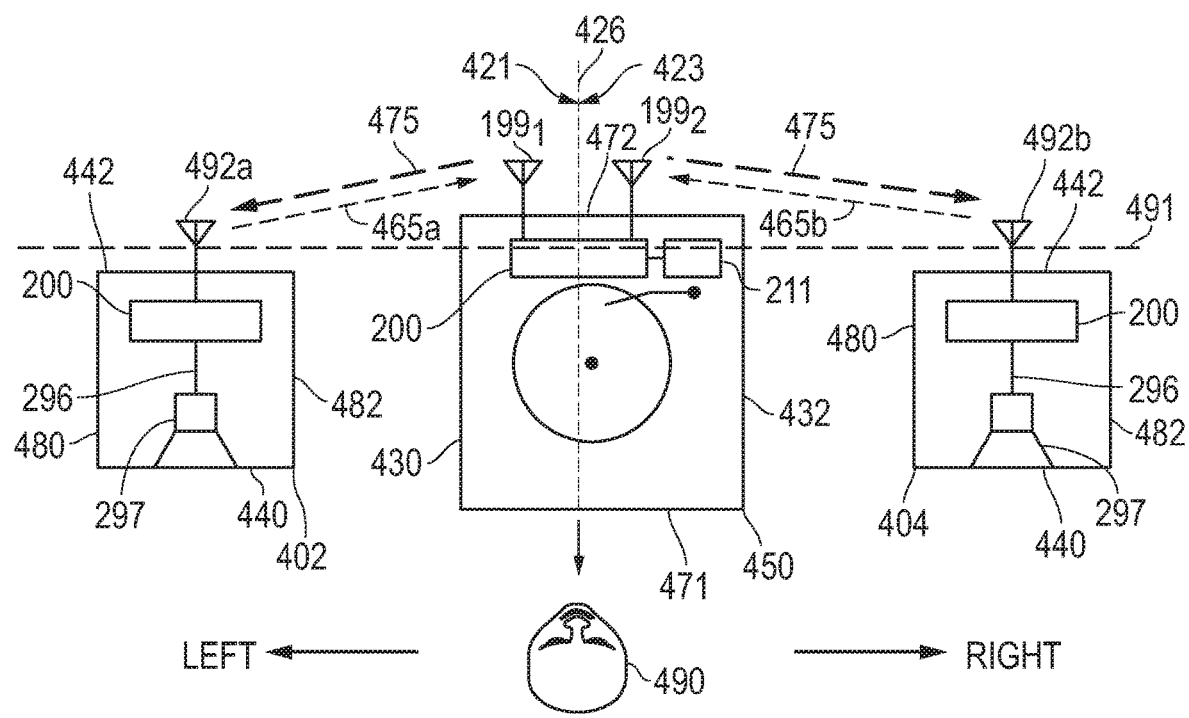
FIG. 4C illustrates an overhead view of audio operating mode configuration according to one exemplary embodiment of the disclosed systems and methods.
Figure 4B:
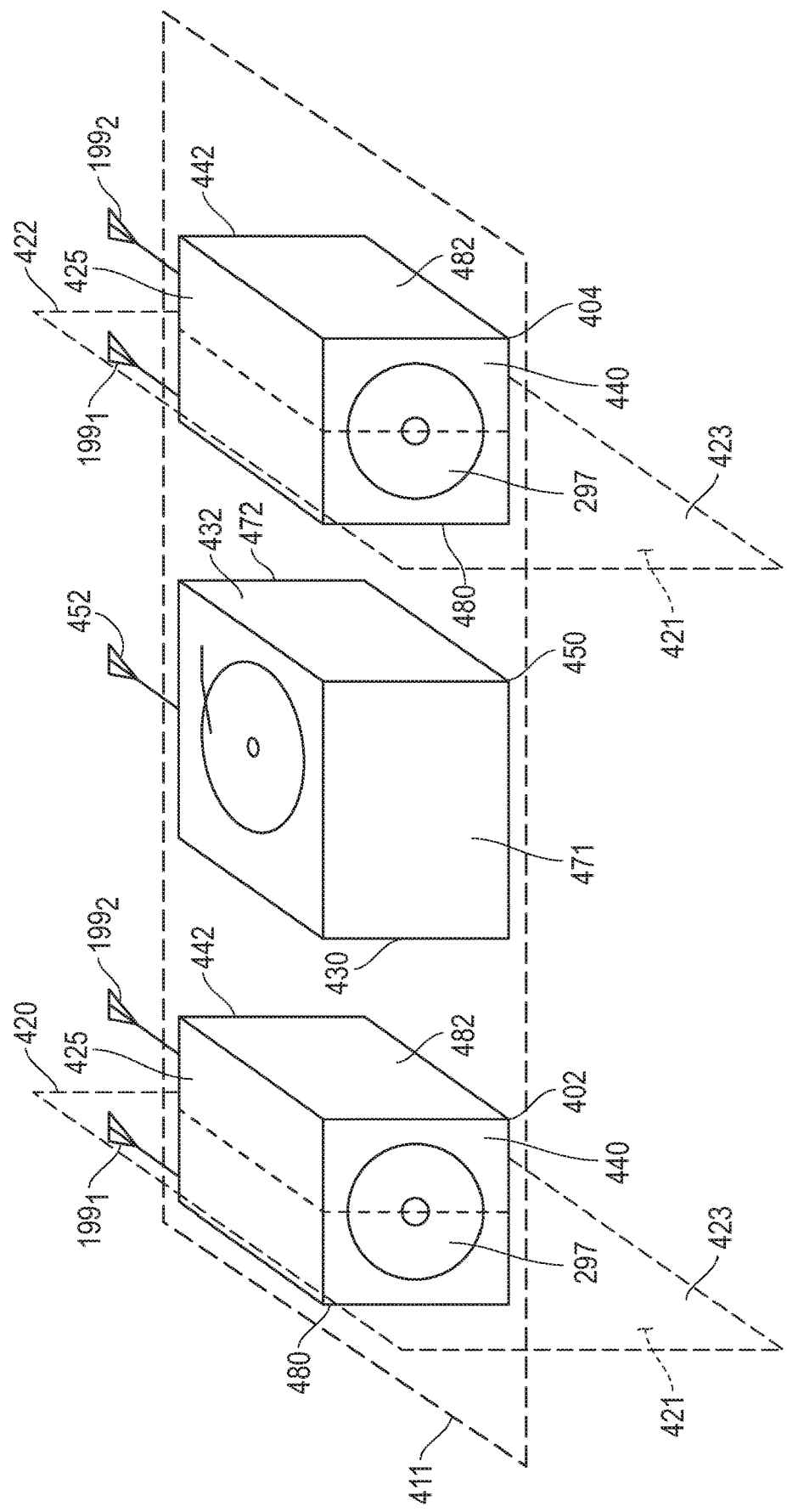
FIG. 4B illustrates a frontal perspective view of audio operating mode configuration according to one exemplary embodiment of the disclosed systems and methods.

FIGS. 4A and 4B illustrate respective overhead and front perspective views another exemplary embodiment of audio operating mode configuration. In this embodiment, a wireless audio source 450 having a front side 471 and a rear side 472 is transmitting a BLE RF signal 460 that conveys stereo audio channel data from antenna 452 by an integrated smart module 200 of audio source 450, e.g., such as a smart phone, tablet computer, notebook computer, virtual assistant device, music player like a turntable or FM receiver or MP3 player, television set top box, etc. In FIGS. 4A and 4B, two separate wireless loudspeaker systems 402 and 404 are positioned on either side 430 or 432 of audio source 450, and each loudspeaker system includes at least one loudspeaker 297 having a top side 425, left side 480, right side 482, front side 440 and a rear side 442. In this embodiment, an optional symmetry line 491 may pass through both antenna elements $199_1$ and $199_2$ of each of loudspeaker systems 402 and 404, as well as optionally through audio source 450. Optional symmetry line 491 is further described in relation to FIG. 4D. Symmetry lines 491 for loudspeaker systems 402 and 404 may lie along the same line as shown in FIGS. 4A and 4C, although this is not necessary (e.g., different symmetry lines 491 may exist for loudspeaker systems 402 and 404). As shown in FIG. 4A, each of loudspeaker systems 402 and 404 are configured with a two-element antenna array to receive signal 460, and also includes an integrated smart module 200 coupled to provide a left or right analog audio channel signal to a respective integrated loudspeaker 297 which reproduces left or right channel audio as analog acoustic sound waves for human listener/s 490 positioned in front of audio source 450 and loudspeaker systems 402 and 404, i.e., in the direction shown by the arrow. As with FIGS. 3A and 3B, switch circuitry 195, DEC/DAC circuitry 293 and amplifier circuitry 295 of FIGS. 1 and 2 may be present but are not shown in FIG. 4A for simplicity of illustration.

As described above, a Bluetooth smart module 200 executing operating mode configuration logic 275 is integrated with each of loudspeaker systems 402 and 404, and is coupled to a two-element antenna array that includes left and right antenna elements $199_1$ and $199_2$ to receive RF signal 460. As shown in FIGS. 4A and 4B, left and right antenna elements $199_1$ and $199_2$ of each of loudspeaker systems 402 and 404 are positioned on either side of an array center plane 420 or 422 that extends from front to rear of the respective loudspeaker system between (and separating) antenna elements $199_1$ and $199_2$ such that the left antenna element $199_1$ of each given loudspeaker system is always positioned on the left side 421 of its array center plane 420 closer to left side 480 the given loudspeaker system and such that right antenna element $199_2$ of the given loudspeaker system is always positioned on the right side 423 of its array center plane 420 closer to right side 482 of the given loudspeaker system.

As further shown in FIGS. 4A and 4B, loudspeaker systems 402 and 404 are positioned on either side 430 or 432 of audio source 450 with one planar side 421 or 423 of the center array plane 420 of each of loudspeaker systems 402 and 404 (together with its corresponding left side 480 or right side 482) facing inward toward a side 430 or 432 of audio source 450 such that one of antenna elements $199_1$ or $199_2$ of each loudspeaker system 402 or 404 is positioned closer to audio source antenna element 450 than is the other antenna element $199_1$ or $199_2$ of the same loudspeaker system 402 or 404. Moreover, each of loudspeaker systems 402 and 404 are similarly oriented in an upright position (with top side 425 facing upward as shown in FIG. 4B) such that left antenna element $199_1$ of loudspeaker system 404 is positioned closer to audio source antenna element 450 than is right antenna element $199_2$ of loudspeaker system 404, while at the same time right antenna element $199_2$ of loudspeaker system 402 is positioned closer to audio source antenna element 450 than is left antenna element $199_1$ of loudspeaker system 402.

Although left and right loudspeaker systems 402 and 404 are shown aligned on either side of audio source 450 in a common elevation plane 411 (e.g., such as resting on a common table top), it will be understood that loudspeaker systems 402 and 404 do not have to be directly aligned in a common plane with audio source 450 but rather may be positioned (e.g., by user 490) in non-aligned fashion and/or at different elevations on opposite sides of audio source 450 in any manner which results in one of antenna elements 199₁ or 199₂ of each loudspeaker system 402 or 404 being positioned closer to audio source antenna element 450 than the other antenna element 199₁ or 199₂ of the same loudspeaker system 402 or 404. This allows measurement of the time and/or phase of arrival of signal 460 at each of antenna elements 199₁ and 199₂ of each loudspeaker system 402 and 404 to determine which side (left or right) of each loudspeaker system first receives signal 460, e.g., from measured signal strength, TDOA or AoA of signal 460 at elements 199₁ and 199₂. In this regard, signal 460 arrives first and with greatest signal strength at the antenna element corresponding to the side of the center array plane 420 or 422 that faces device 450, and with an AoA (direction) that corresponds to this side. Knowing which side of the array center plane (and therefore which loudspeaker left or right side) faces inward toward the audio source 450 allows operating mode configuration logic 275 executing on smart module 200 of each given loudspeaker system 402 and 404 to determine whether it is positioned on the left side of audio source 450 or the right side of audio system 450.

For example, in the particular layout of FIGS. 4A and 4B, antenna element 199₂ of loudspeaker system 402 receives signal 460 before antenna element 199₁ of loudspeaker system 402, indicating to operating mode configuration logic 275 that loudspeaker system 402 is on the left side of audio source 450. At the same time, antenna element 199₁ of loudspeaker system 404 receives signal 460 before antenna element 199₂ of loudspeaker system 404, indicating to operating mode configuration logic 275 that loudspeaker system 404 is on the right side of audio source 450. Operating mode configuration logic 275 of each given loudspeaker system 402 and 404 may respond to this determination of the relative (left or right) positioning of the given loudspeaker system to audio source 450 by causing output of only left stereo channel audio or right channel audio from the received stereo signal 460 via audio channel 296 to the loudspeaker 297 of the given loudspeaker system 402 or 404, i.e., by outputting only left stereo channel audio to loudspeaker 297 of leftmost loudspeaker system 402 and outputting only right stereo channel audio to loudspeaker 297 of rightmost loudspeaker system 404 of FIGS. 4A and 4B.

In one exemplary embodiment, operating mode configuration logic 275 of each loudspeaker system 402 and 404 may implement a temporarily operating configuration calibration mode when each wireless audio streaming session from audio source 450 is first started (e.g., for 10 to 30 seconds or other suitable greater or lesser time duration after a BLE connection is established between audio source 450 and loudspeaker systems 402 and 404). During the temporary operating configuration calibration mode, left and right orientation of each of loudspeaker systems 402 and 404 is determined by its respective smart module 200 and left or right audio channel assignment is made for outputting analog audio channel to its respective loudspeaker 297. This allows correct stereo audio channel assignment to be made every wireless audio streaming session no matter which side of audio source 450 that each loudspeaker system 402 and 404 is positioned, e.g., to allow a user to reposition or swap the left and right positioning of loudspeaker systems 402 and 404 between wireless audio streaming sessions. In another exemplary embodiment, operating mode configuration logic 275 of each loudspeaker system 402 and 404 may implement a continuous operating configuration calibration mode such that left and right orientation of each of loudspeaker systems 402 and 404 relative to audio source 450 is continuously determined by its respective smart module 200 and left or right audio channel assignment made continuously in real time, e.g., to maintain correct left and right audio channel assignment for loudspeaker systems 402 and 404 even when the left and right positions of loudspeaker systems 402 and 404 is exchanged or swapped by a user during a wireless audio streaming session.

FIG. 4C illustrates another exemplary embodiment of audio operating mode configuration based on side of arrival determination for an audio source 450 and loudspeaker systems 402 and 404 that are similarly configured and oriented relative to each other as in FIGS. 4A and 4B. However, in this embodiment, audio source 450 is configured with left and right antenna elements 199₁ and 199₂ positioned on either side of an array center plane 426 and configured to receive RF measurement signals 465a and 465b transmitted by respective antennas 492a and 492b of loudspeaker systems 402 and 404 as shown. In this regard, smart modules 200 of loudspeaker systems 402 and 404 may be first configured to implement a temporarily operating configuration calibration mode (e.g., for 10 to 30 seconds or other suitable greater or lesser time duration after a BLE connection is established between audio source 450 and loudspeaker systems 402 and 404). During this temporarily operating configuration calibration mode, smart modules 200 of loudspeaker systems 402 and 404 may operate in transmit mode to transmit respective orientation signals 465a and 465b sequentially or simultaneously to antenna elements 199₁ and 199₂ of audio source 450 with smart module 200 of audio source 450 operating in receive mode. Thereafter, when positioning (left or right) of loudspeaker systems 402 and 404 relative to audio source 450 has been determined, smart module 200 of audio source 450 may then operate in transmit mode to transmit a BLE RF signal 475 that conveys stereo audio channel data to antennas 492a and 492b of respective loudspeaker systems 402 and 404, with smart module 200 of each of loudspeaker systems 402 and 404 operating in receive mode.

In the embodiment of FIG. 4C, antenna element 199₁ of audio source 450 is positioned closer to antenna 492a of loudspeaker system 402, and antenna element 199₂ of audio source 450 is positioned closer to antenna 492b of loudspeaker system 404. In the particular layout shown in FIG. 4C, antenna element 199₁ of audio source 450 receives measurement RF signal 465a from loudspeaker 402 before antenna element 199₂ of audio source 450 receives measurement RF signal 465a from loudspeaker 402 (and with a corresponding AoA), indicating to operating mode configuration logic 275 of audio source 450 that loudspeaker system 402 is positioned on the left side of audio source 450. At the same time, antenna element 199₂ of audio source 450 receives measurement RF signal 465b from loudspeaker 404 before antenna element 199₁ of audio source 450 receives measurement RF signal 465b from loudspeaker 404 (and with a corresponding AoA), indicating to operating mode configuration logic 275 of audio source 450 that loudspeaker system 402 is positioned on the right side of audio source 450. Operating mode configuration logic 275 of audio source 450 may respond to this determination of the relative (left or right) positioning of the given loudspeaker system to audio source 450 by assigning left stereo channel audio of the transmitted stereo RF signal 475 to loudspeaker system 402 and assigning right stereo channel audio of the transmitted RF stereo signal to loudspeaker system 404.

In the embodiment of FIG. 4C, each of left and right stereo channel audio may be assigned by audio source 450 to either one of loudspeaker systems 402 and 404 in any suitable manner, e.g., by transmitting a single respective channel to both loudspeakers over two connections, or by transmitting a multiplexed stream from which each loudspeaker picks only its respective assigned channel. In this regard, each of the left and right audio channel streams of the transmitted RF signal 475 itself may contain information identifying for which loudspeaker it is meant. However, it is alternatively possible that transmitted stereo RF signal 475 may be a normal stereo audio stream, in which case each loudspeaker systems 402 and 404 may be separately configured as a left channel speaker or a right channel speaker, for example, by separate command signal transmitted from audio source 450.

As with the embodiments of FIGS. 3A and 3B, AoD techniques may alternatively be used in the embodiments of FIGS. 4A, 4B and 4C to determine relative orientation of loudspeaker systems 402 and 404 relative to audio source 450, and then operating mode configuration of stereo audio channels may be selected based on this determined system orientation. For example, the smart module 200 of each loudspeaker system of FIGS. 4A and 4B may first operate during a temporary operating configuration calibration mode to transmit a respective BLE RF measurement signal 470a or 470b from antenna elements $199_1$ and $199_2$ of each loudspeaker system 402 and 404 using a switching pattern or sequence that is implemented by an array switch 195 (shown in FIGS. 1 and 2) to select between antenna elements $199_1$ and $199_2$ to transmit the measurement signal 470a or 470b one element at a time to audio source 450. Smart module 200 of audio source 450 may operate in receive mode to receive the measurement signals 470a and 470b from antenna elements $199_1$ and $199_2$ of loudspeaker systems 402 and 404, and based on these received measurement signals then assign left stereo channel audio of the subsequently transmitted stereo signal to loudspeaker system 402 and right stereo channel audio of the transmitted stereo signal to loudspeaker system 404.

Similarly, the smart module 200 of audio source 450 of FIG. 4C may alternatively first operate during a temporary operating configuration calibration mode to transmit a BLE RF measurement signal (e.g., similar to or the same as stereo audio signal 475) from antenna elements $199_1$ and $199_2$ to each loudspeaker system 402 and 404 using a switching pattern or sequence in the manner previously described. Smart modules 200 of each loudspeaker system 402 and 404 may operate in receive mode to receive the measurement signal from antenna elements $199_1$ and $199_2$ of audio source 450, and based on the received measurement signal then determine left or right orientation of its loudspeaker system, and assign either left stereo channel audio or right stereo channel audio for analog output to its respective loudspeaker 297.

Figure 4D:
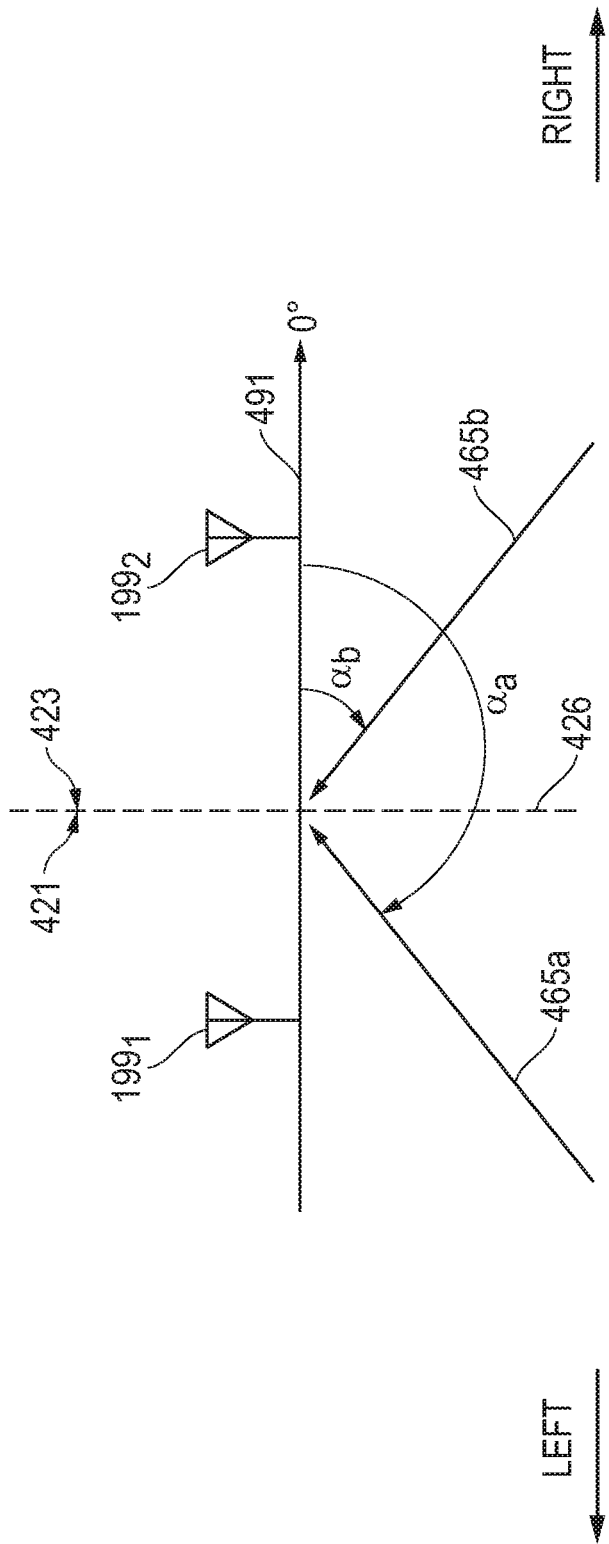
FIG. 4D illustrates AoA determination according to one exemplary embodiment of the disclosed systems and methods.

FIG. 4D illustrates use of AoA to detect which side of a center plane 426 that a signal transmitter is positioned. Specifically, in FIG. 4D, AoA is employed to determine which side of an array center plane 426 that each of signals 465a and 465b arrive at an antenna array that has two antenna elements $199_1$ and $199_2$, e.g., such as employed in the embodiment of FIG. 4C. As shown in FIG. 4D, a symmetry line 491 passing through antenna elements $199_1$ and $199_2$ and that is perpendicular to center plane 426 may optionally be used as a reference vector to measure AoA of each of signals 465a and 465b (e.g., illustrated in FIG. 4D as $\alpha_a$ and $\alpha_b$, respectively). Thus, for a device having an antenna array having two antenna elements $199_1$ and $199_2$ it is possible in one embodiment to only measure AoA relative to the optional symmetry line 491 passing through the two antenna elements $199_1$ and $199_2$ as shown. In this regard, an antenna array having two or more antenna elements 199 may be employed to determine signal direction relative to a single axis or vector, while an antenna array having three or more antenna elements not arranged relative to each other in a single line may be employed to determine signal direction angle (e.g., signal direction angle through a full 180 degree or other range of possible angles relative to a given axis or vector such as described further herein in relation to Tables 1 and 2).

Knowing the AoA that each of signals 465a and 465b arrives relative to symmetry line 491 allows determination of which side of center plane 420 that the transmitting source for each of respective signals 465a and 465b is positioned. For example, a determined AoA of between 270° and 360° and between 0° and 90° indicates that a transmitting source for the received signal is positioned on the right side of center plane 491, and a determined AoA of between 90° and 270° indicates that a transmitting source for the received signal is positioned on the left side of center plane 491. It will be understood that greater AoA determination accuracy may be obtained using a receiving antenna array with more than two antenna elements 199. However, an array having as few as two antenna elements 199 may be employed as illustrated in FIG. 4D, e.g., in one embodiment, the error in AoA determination may be up to 90° one either side of symmetry line 491 for a transmitting signal source that is positioned along the symmetry line 491 on either side of the receiving antenna array (given the assumption that both loudspeaker systems are at, or almost at, right angle positions to the antenna array that includes two antenna elements $199_1$ and $199_2$).

Although FIG. 4D illustrates an embodiment in which AoA is measured relative to symmetry line 491, it will be understood that any other suitable reference vector may be employed, e.g., a reference vector lying within and parallel to center plane 426 (and perpendicular to symmetry line 491) may alternatively be employed for measurement of AoA. In the latter case, it is possible that symmetry line 491 may be absent.

Figure 5:
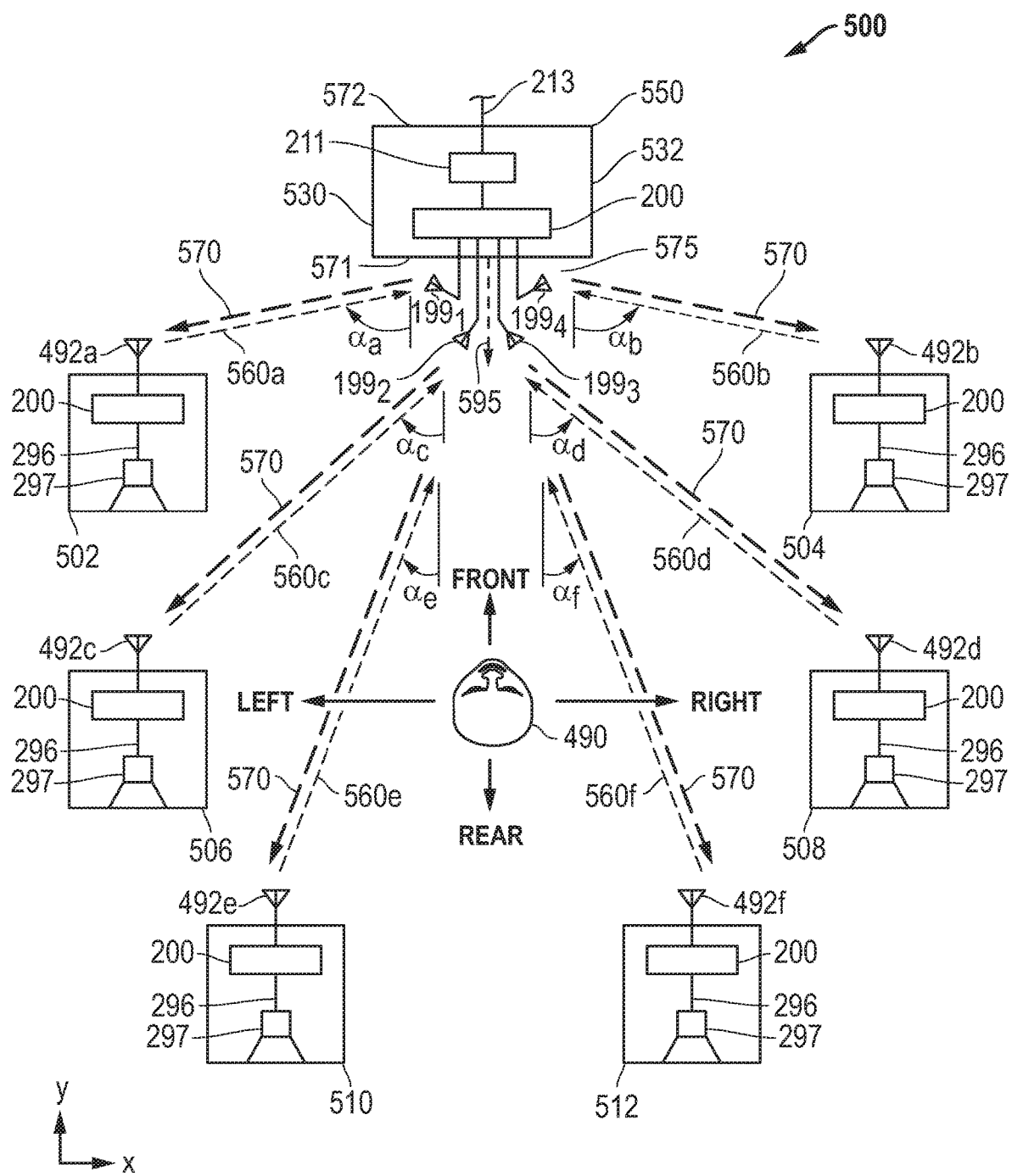
FIG. 5 illustrates an overhead view of audio operating mode configuration according to one exemplary embodiment of the disclosed systems and methods.

FIG. 5 illustrates an overhead view of audio operating mode configuration of a wireless audio system in the form of a home theater system 500 having a wireless audio source 550 (e.g., surround sound receiver, television with integrated surround sound, Blu-Ray player with integrated surround sound, etc.) in RF communication (e.g., BLE wireless communication) with multiple wireless loudspeaker systems 492a to 492f that are positioned to surround a human listener or user 490. Audio source 550 and loudspeaker systems 492a to 492f may be all positioned at the same height above ground level (e.g., such as all resting on the common plane of the same floor or on equipment stands of the same height). However, it will be understood that loudspeaker systems 492a to 492f may be alternatively positioned at different elevations above ground level, e.g., such as would be the case where audio source 550 is positioned on a stand at a height of three feet above ground level, loudspeaker systems 502, 504, 506 and 508 are each hung from the wall at a height of five feet above ground level, and loudspeaker systems 510 and 512 are suspended near the ceiling at a height of nine feet above ground level. Moreover, two or more of the loudspeaker systems of system 500 may be the same type of loudspeaker systems and/or may be positioned differently (e.g., ad hoc) relative to audio source 550 by a user for each different room or environment. In the illustrated embodiment there are six loudspeakers systems shown, such as would be the case with a 6.1 surround sound system. However, it will understood that the disclosed systems and methods may be implemented with home theater system configurations having any number of three or more loudspeaker systems (e.g., 5.1 surround sound with five loudspeakers, 7.1 surround sound with seven loudspeakers, etc.).

Table 1 below lists example positioning and corresponding surround sound channel assignment for each of loudspeaker systems 492a to 492f of FIG. 5, as well as the identity of measurement signals which are described further below. It will be understood that use of negative angles to measure AoA ($\alpha$) relative to a reference vector is exemplary only, and that any other angle measurement convention may be employed that is suitable for characterizing angles relative to the reference vector (e.g., using positive angle range measured 0° to 360° from the reference vector) as long as it identifies the angle of arrival for the received signals.

TABLE 1

Surround Sound Assignment and Measurement signals

| Loudspeaker System | Transmitted Measurement Signal | Angle of Arrival (AoA) of Measurement Signal | Surround Sound Audio Channel Assignment |
|---|---|---|---|
| 492a | 560a | $\alpha_a = 80°$ | Front Left |
| 492b | 560b | $\alpha_b = -80°$ | Front Right |
| 492c | 560c | $\alpha_c = 45°$ | Center Left |
| 492d | 560d | $\alpha_d = -45°$ | Center Right |
| 492e | 560e | $\alpha_e = 20°$ | Rear Left |
| 492f | 560f | $\alpha_f = -20°$ | Rear Right |

In this embodiment, audio source 550 has a front side 571, rear side 572, left side 530 and right side 532 as oriented relative to a human listener or user 490, and is configured to transmit a wireless RF surround sound signal 570 (e.g., such as BLE signal; 802.11-based Wi-Fi standard signal such as 802.11a, 802.11b/g/n, 802.11ac, etc.; proprietary RF signal; etc.) to each of loudspeaker systems 492a to 492f after relative position of each of these loudspeaker systems is determined relative to audio source 550. Audio source 550 also includes an antenna array 575 that in this embodiment includes four antenna elements $199_1$ to $199_4$ coupled to a Bluetooth smart module 200 that is executing operating mode configuration logic 275 as previously described. Although antenna array 575 includes four antenna elements 199, it will be understood that an array may include any greater or lesser number of multiple antenna elements 199 (e.g., such as three or more antenna elements, alternatively four or more antenna elements 199) for a home theater system application such as illustrated in FIG. 5.

In FIG. 5, each of loudspeaker systems 502, 504, 506, 508, 510 and 512 includes a Bluetooth smart module 200 executing an instance of operating mode configuration logic 275 that is configured to control transmission of a unique BLE RF measurement signal 560a to 560f, respectively, via a corresponding loudspeaker system antenna element 492 to antenna array 575 of audio source 550. Antenna element 492 of each loudspeaker system of system 500 may also be configured to receive the wireless surround sound signal later provided by audio source 550. In this regard, the wireless RF surround sound signal 570 may be, for example, either transmitted as separate independent audio channel streams assigned to each of the respective loudspeaker system, or multiplexed from which each loudspeaker system picks its own assigned audio channel for analog reproduction. It is also possible to transmit RF surround sound signal 570 as a single compressed audio stream such as MP3 or advanced audio coding (AAC) stream which is decoded and then the correct channel selected to play or reproduced in analog manner. As before, the wireless RF surround sound signal 570 may be BLE, Wi-Fi, or any other protocol suitable for transmitting wireless audio channels.

Each given loudspeaker system 502, 504, 506, 508, 510 and 512 also includes a respective loudspeaker 297 that is coupled to receive an analog surround sound channel 296 from smart module 200 of the given loudspeaker system that is assigned to the given loudspeaker system by audio source 550 based on determined relative position of the given loudspeaker system to the audio source 550 as described below. As with FIGS. 3A and 3B, and FIGS. 4A-4C, switch circuitry 195, surround sound DEC/DAC circuitry 293 and amplifier circuitry 295 of FIGS. 1 and 2 may be present but are not shown in FIG. 5 for simplicity of illustration.

As described above, a Bluetooth smart module 200 executing operating mode configuration logic 275 is integrated with audio source 550, and is coupled to a four-element antenna array 575 that centered upon a designated reference vector 595 that has been selected for reference in determining AoA of individual measurement signals 560a to 560f transmitted as shown by loudspeaker systems 502, 504, 506, 508, 510 and 512, respectively. In this embodiment, reference vector 595 coincides with a forward-extending array center plane from audio source 550, although this is not necessary. As shown in FIG. 5, operating mode configuration logic 275 of each given loudspeaker speaker system may control transmission of its respective measurement signal 560 to audio source 550 after the loudspeaker systems of system 500 have been positioned as desired (e.g., by a human user) in the layout of home theater system 500. This measurement signal transmission procedure may be performed by immediately transferring information and simultaneously performing AoA measurement for all loudspeaker systems 502, 504, 506, 508, 510 and 512, or may optionally proceed in a sequential manner (i.e., one loudspeaker system at a time such as in a clockwise or counterclockwise pattern or other assigned or random sequence), until AoA of the measurement signal transmitted from each of the loudspeaker systems of system 500 has been determined by smart module 200 of audio source 550. Operating mode configuration logic 575 may then assign a different surround sound audio channel to each different loudspeaker system 502, 504, 506, 508, 510 and 512 as outlined in Table 1 above based on the determined AoA of its respective measurement signal 560 illustrated in FIG. 5 and a predetermined relationship (e.g., lookup table stored in NVM) of surround sound channels versus AoA value ranges as shown in example of Table 2 below. For ease of illustration, FIG. 5 illustrates determined AoA (a) values for each of loudspeaker system 502, 504, 506, 508, 510 and 512 relative to a line that is parallel to reference vector 595, it being understood that these AoA values are determined relative to reference vector 595. It will also be understood that the AoA value ranges of Table 2 are exemplary only, and may vary as needed or desired to fit a given multi-channel system application and/or number of channels employed.

TABLE 2

AoA Values for Surround Sound Assignment

| Determined Angle of Arrival (AoA) Value | Surround Sound Audio Channel Assignment |
|---|---|
| 60° ≤ AoA ≤ 90° | Front Left |
| −60° ≥ AoA ≥ −90° | Front Right |
| 40° ≤ AoA < 60° | Center Left |
| −40° ≥ AoA > −60° | Center Right |
| 5° ≤ AoA < 40° | Rear Left |
| −5° ≥ AoA > −40° | Rear Right |

Table 1 gives example surround sound channel audio channel assignments that may be determined by operating mode configuration logic 275 for the exemplary home theater system layout shown in FIG. 5 using the predetermined relationship of AoA values versus surround sound channel assignment as shown in example of Table 2. After relative positioning of loudspeakers 502, 504, 506, 508, 510 and 512 and corresponding surround sound channel assignments are determined, operating mode configuration logic 275 may control audio source 550 to transmit a wireless RF Surround Sound signal 570 that includes each of the six different surround sound channels for audio reproduction as analog acoustic sound waves by one particular loudspeaker system assigned to it in Table 1. Each given loudspeaker system of system 500 may respond to receipt of the surround sound signal 570 by outputting only the particular surround sound channel audio assigned to the given loudspeaker system from its respective loudspeaker 297.

As with other embodiments, operating mode configuration logic 275 of audio source 550 and of each loudspeaker system of system 500 may be configured to implement a temporarily operating configuration calibration mode (e.g., in sequential coordinated manner with each other) when each wireless audio streaming session from audio source 550 is first started (e.g., for 10 to 30 seconds or other suitable greater or lesser time duration after a BLE connection is established between audio source 550 and each of loudspeaker systems of system 500) during which the relative positioning of each of loudspeaker systems of system 500 is determined. It is alternatively possible that loudspeaker systems of system 500 may implement a continuous operating configuration calibration mode by sequentially transmitting measurement signals 560 continuously such that relative positioning of each loudspeaker system to audio source 550 is continuously determined and reassigned continuously in real time, e.g., if loudspeaker systems are exchanged or swapped by a user during a wireless audio streaming session.

Also, as with other embodiments, AoD techniques may alternatively be used in the embodiment FIG. 5 to determine relative orientation of each of 502, 504, 506, 508, 510 and 512 relative to audio source 550 by transmitting a BLE RF measurement signal (e.g., similar to or the same as signal 570) from multiple antenna elements of antenna array 575 using a switching pattern or sequence during a temporary operating configuration calibration mode, in which case the operating mode configuration logic 275 of the smart module 200 of each given loudspeaker system may operate in receive mode to receive this measurement signal from audio source 550 and determine relative positioning of the given loudspeaker system to audio source 550. The operating mode configuration logic 275 of each loudspeaker system of system 500 may then select the particular surround sound channel audio corresponding to its determined relative position (e.g., using the predetermined relationship of Table 2) for output as analog audio to its respective loudspeaker 297.

Figure 6:
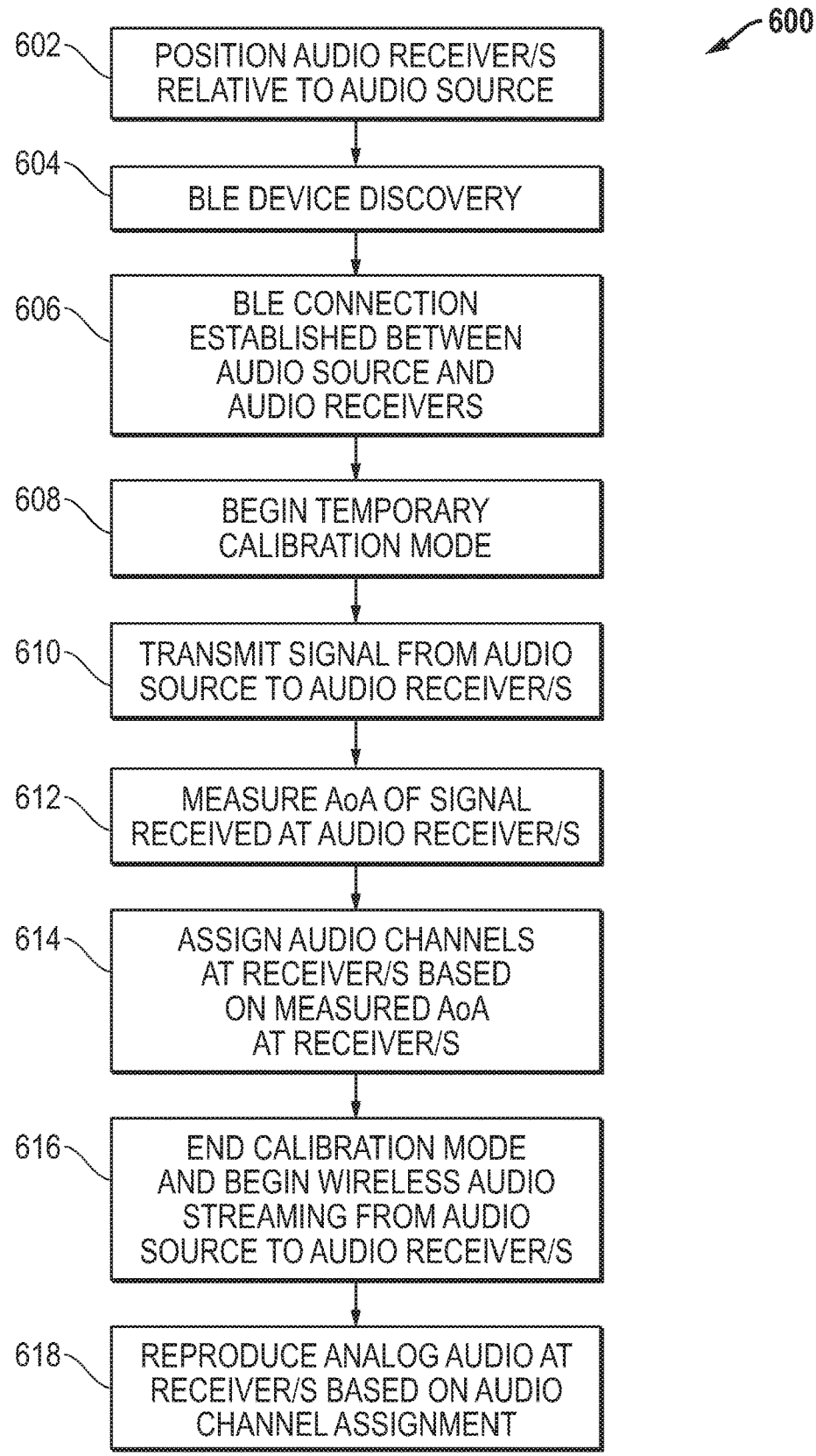
FIG. 6 illustrates methodology according to one exemplary embodiment of the disclosed systems and methods.

FIG. 6 illustrates one exemplary embodiment of methodology 600 that may be employed to configure operating mode based on AoA of a signal received at one or more audio receivers, such as a BLE wireless device that includes a Bluetooth smart module 200 and operating mode configuration logic 275 which may be present in each of an audio source and one or more audio receivers to perform the steps of methodology 600, e.g., in coordinated fashion with each other. Examples of such system configurations include wireless audio streaming environments such as illustrated and described in relation to FIGS. 3A-3B and 4A-4B. However, it will be understood that methodology 600 may be alternatively employed to configure other types of operating modes besides audio channel assignments, e.g., such as marine, truck, train, aircraft or spacecraft lighting modes, etc. Moreover, it will be understood that the methodology of FIG. 6 may be alternatively implemented to configure operating mode based only on determination of an array center plane first side of arrival using only TDOA of a signal received at individual elements of an antenna array of an audio receiver.

As shown, methodology 600 begins with step 602 in which one or more audio receiver/s (e.g., headphone system 300, loudspeaker systems 402 and 404, etc.) are positioned relative to an audio source (e.g., audio source 350 or 450), e.g., by a human user. Device discovery is then performed in step 604, e.g., BLE device discovery by using the audio source as a BLE scanner and the audio receiver/s as BLE advertiser/s, or vice-versa. After device discovery, a connection is established in step 606 between the audio source and the audio receiver/s, e.g.,. BLE connection with audio source acting as master and audio receiver/s acting as slave/s, or vice versa. After the connection is established, the audio source and audio receiver/s communicate over the established connection to coordinate a temporary calibration mode that begins in step 608. Next, in step 610 a wireless RF signal is transmitted from the audio source to the audio receiver/s (e.g., which may be a dedicated measurement signal or a multi-channel audio signal itself), and then AoA is determined in step 612 at each of the one or more audio receiver/s by the smart module 200 of each audio receiver. In step 614, operating mode configuration logic 275 on each given audio receiver may then assign audio channel/s to one or more speakers of the given audio receiver, e.g., in the manner illustrated and described in relation to embodiments of FIGS. 3A-3B and FIGS. 4A-4B.

After audio channel/s have been assigned at each of the one or more audio receivers, the calibration mode is ended by operating mode configuration logic 275 in step 616, and wireless audio streaming of multi-channel audio occurs from audio source to the audio receiver/s. In step 618, analog audio is then reproduced at the speakers of each of the audio receiver/s as analog acoustic sound waves according to the audio channel assignment made in step 614.

Figure 7:
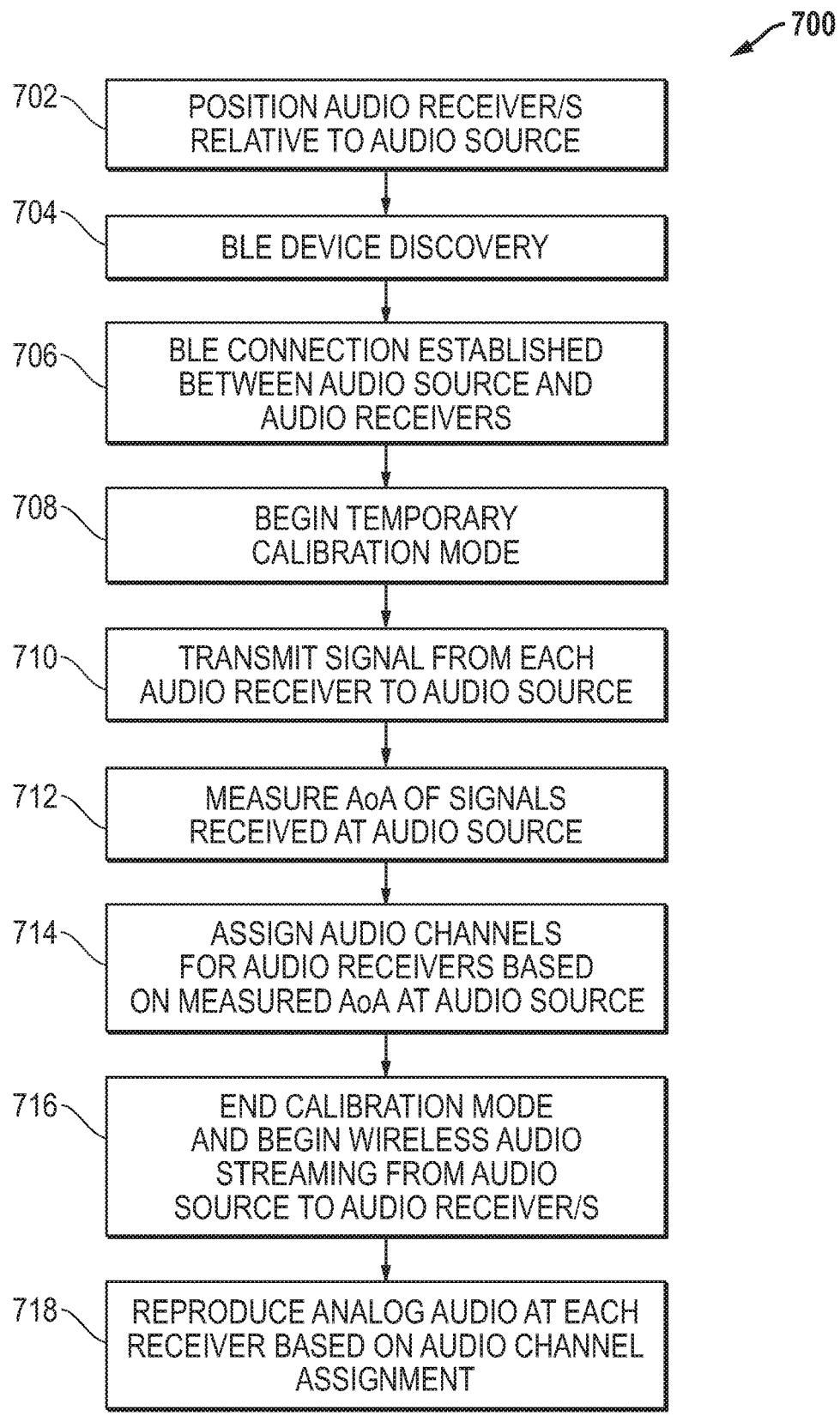
FIG. 7 illustrates methodology according to one exemplary embodiment of the disclosed systems and methods.

FIG. 7 illustrates another exemplary embodiment of a methodology 700 that may be employed to configure operating mode based on AoA of a signal received at an audio source from multiple audio receivers, each of which may be a BLE wireless device that includes a Bluetooth smart module 200 and operating mode configuration logic 275 which may be present in each of an audio source and one or more audio receivers to perform the steps of methodology 700, e.g., in coordinated fashion with each other. Examples of such system configurations include wireless audio streaming environments such as illustrated and described in relation to FIGS. 4C and 5. However, it will be understood that methodology 700 may be alternatively employed to configure other types of operating modes besides audio channel assignments, e.g., such as marine, truck, train, aircraft or spacecraft lighting modes, etc.. Moreover, it will be understood that the methodology of FIG. 7 may be alternatively implemented to configure operating mode based only on determination of an array center plane first side of arrival using only TDOA of a signal received at individual elements of an antenna array of an audio source.

As shown, methodology 700 begins with step 702 in which multiple audio receivers (e.g., loudspeaker systems 402 and 404 of FIG. 4C, loudspeaker systems 502-512 of FIG. 5, etc.) are positioned relative to an audio source (e.g., audio source 450 or 550), e.g., by a human user. Device discovery is then performed in step 704, e.g., BLE device discovery by using the audio source as a BLE scanner and the audio receiver/s as BLE advertiser/s, or vice-versa. After device discovery, a connection is established in step 706 between the audio source and the audio receivers, e.g.,. BLE connection with audio source acting as master and audio receivers acting as slaves, or vice versa. After the connection is established, the audio source and audio receivers communicate over the established connection to coordinate a temporary calibration mode that begins in step 708.

Next, in step 710 a different wireless RF signal is transmitted from each audio receiver (e.g., as a dedicated measurement signal from each audio receiver) to the audio source. Operating mode configuration logic 275 of the audio source and the different audio receivers may coordinate with each other such that the different audio receivers transmit their respective measurement signals one at a time to the audio source until all audio receivers have transmitted their measurement signal during the calibration period, e.g., using a dedicated sequence in which each audio receiver uses an assigned transmit time period (e.g., from 0.5 to 1 seconds or other suitable greater or lesser time period) that is different from the assigned transmit time period of the other audio receivers to avoid interference and/or such that the audio source may identify which audio source is transmitting during a given time period. Alternatively, each audio receiver may transmit an encoded measurement signal unique to the given audio receiver and/or measurement signals may be transmitted simultaneously from multiple audio receivers where the Bluetooth smart module of the audio source is capable of simultaneously processing the multiple different measurement signals using the methodology described herein.

AoA of each measurement signal received from the audio receivers is next determined in step 712 by smart module 200 of the audio source. In step 714, operating mode configuration logic 275 on the audio source may then assign separate audio channel/s to the different audio receivers for analog audio reproduction as analog acoustic sound waves, e.g., in the manner illustrated and described in relation to embodiments of FIGS. 4C and 5. After audio channel/s have been assigned to each of the multiple audio receivers, the calibration mode is ended (e.g., by the coordinated operating mode configuration logic 275 of the audio source and the audio receivers) in step 716, and wireless audio streaming of multi-channel audio occurs from audio source to the multiple audio receivers begins with the audio receiver channel assignment included in the transmitted multi-channel wireless RF signal transmitted to the multiple audio receivers. In step 718, analog audio is then reproduced as analog acoustic sound waves at the speakers of each of the audio receivers according to the audio channel assignment made in step 714.

It will be understood that methodologies 600 and 700 of FIGS. 6 and 7 are exemplary only, and that different combinations of fewer, additional, re-ordered and/or alternative steps may be employed in other embodiments.

In the implementation of BLE wireless communications, example advertising packet types that may be transmitted from an advertiser (or broadcaster) device include:
ADV_IND connectable and scannable undirected advertising event
ADV_DIRECT_IND connectable directed advertising event
ADV_NONCONN_IND non-connectable or non-scannable undirected advertising event
ADV_SCAN_IND scannable undirected (non-connectable) advertising event.

In BLE advertising (or broadcast state), an advertising device or broadcaster uses its link layer to control advertising packet transmit during recurring spaced advertising events. During each advertising event advertising packets are transmitted in round robin fashion on one advertising channel of three designated advertising channels at a time (BLE advertising channels 37, 38 and 39), one or more of which may be received by a link layer of a scanning (or observer) device that is listening on the different advertising channels one at a time. The link layer of the advertising (or broadcaster) device may use packet transmission timing parameters to control timing of sequential advertising events at determined advertising event time intervals (T_advEvent) from each other using a pseudorandom number generator that implements a pseudorandom number generation algorithm. Broadcast advertising packets are non-connectable. During advertising (or broadcast) state, a link layer of a scanning device scans for and listens for advertising packets on the different advertising channels at sequential listening window times of a scanning sequence that are spaced apart from each other by a determined scan interval, scan_Int that is not synchronized with the advertising events. In some cases, a scanning (or observer) device may continuously listen for advertising packets to ensure timely reception of same. Further information on advertising or broadcasting timing may be found described in United States Patent Application Publication Number 20180007523, and in U.S. patent application Ser. No. 15/650,405, filed Jul. 14, 2017, each of which is incorporated herein by reference in its entirety for all purposes Example types of response packets that may be transmitted by a scanning device in response to received advertising packets of the advertising device include:
SCAN_REQ scan request for further information from advertiser
CONNECT_REQ connect request.

If the advertiser device sends either the ADV_IND or ADV_DIRECT_IND packets, a scanner desiring to exchange data with the advertiser may send a CONNECT_REQ packet. If the advertiser accepts the CONNECT_REQ packet, the devices become connected and the communication may be started. At this point, the advertiser becomes a slave and the scanner becomes a master. After connected, the master device may request bonding with the slave device. This means that the devices exchange long term keys or other encryption info to be stored for future connections. In another case, the connection may be encrypted only for the duration of the connection by pairing, during which short term keys are exchanged between the master device and slave device. Pairing with short term key exchange is normally required to occur before bonding between the devices may occur the first time. Exchange of long term keys or other encryption information for bonding may then occur during the paired connection. Once a master device and slave device have exchanged long term keys or other encryption info, a master device may request bonding directly with the slave device without requiring pairing first.

Instead of the CONNECT_REQ, the scanner device may also respond with SCAN_REQ, which is a request for further information from the advertiser. This may be sent as a response to ADV_IND or ADV_SCAN_IND advertising packets.

When an advertising receives a SCAN_REQ packet from a scanning device, the advertising device may give more information to the scanning device by transmitting a scan response (SCAN_RSP) packet. A SCAN_RSP packet may contain information on the name of the advertising device and on the services the advertising device is able to provide. However, SCAN_RSP packet is not limited to carry only this information but may contain other data as well or instead.

As said, a scanning device wishing to connect with the advertising device may send a CONNECT_REQ packet that contains data on one or more of the following: transmit window size defining timing window for first data packet, transmit window offset that is off when the transmit window starts, connection interval which is the time between connection events, slave latency defines number of times the slave may ignore connection events from the master, connection timeout is maximum time between two correctly received packets in the connection before link is considered to be lost, hop sequence is a random number appointing the starting point for a hop, channel map, CRC (Cyclic Redundancy Check) initialization value. The CONNECT_REQ packet initiates the connection, i.e., creates a point-to-point connection between the devices. After a connection is established between two devices, service and/or service characteristic discovery may occur (with or without pairing or bonding first taking place) during which a first one of the connected devices may send a request to the second connected device asking for a list of services and/or service characteristics that are available from the second device. For example, the second device may respond to this request by providing GATT data to the first device that includes a list of the available BLE services from the second device and/or BLE service characteristics (e.g., configuration data or user data for a service) of the second device. The GATT data may include a list of service universally unique identifiers (UUIDs) and/or service characteristic UUIDs.

Once a connection is established between a pair of wireless devices (e.g., acting as nodes in a mesh network as described herein), the two devices may synchronize timing for non-continuous periodic connection events to follow in order to reduce power consumption. In the BLE specification, the connection interval may be selected to be any value from 7.5 milliseconds to four seconds. This interval may be selected by the master device and transmitted to the slave of the connection. During any given connection event, each wireless device may listen for data packets transmitted in a signal from the other device, and/or transmit data packets to the other device when there is data to send. One or both devices may remain in a sleep or inactive state between the synchronized connection events, during which various device components including radio transmitter, receiver or transceiver components (and possibly one or more wireless device processing devices) are placed in an inactive state to reduce device power consumption. For example, a slave device may ignore any one or more connection events and remain in a sleep state (e.g., with radio not transmitting or listening) during one or more connection events when the slave has no new data to send. In BLE, an integer SLAVE_LATENCY value may be selected to specify the number of consecutive connection events that may be ignored by the slave device before it must wake up and respond to the master to confirm continued existence of the current connection. Because connection events are synchronized during a connection, and because a number of connection events may be ignored, wireless communication in the connected state consumes much less power than in the advertising (or broadcast) state where transmission of advertising packets from the advertising (or broadcasting) device occurs on multiple advertising channels during each advertising event, and where scanning device listening windows are not synchronized with the channel transmissions of the advertising events.

The state for passing advertising packets is called "advertising state" or "broadcast state" as the case may be, and the state for connection is called "connected state". In both states, data transfer occurs. A slave device may be a sensor, actuator or other device, such as a temperature sensor, heart rate sensor, lighting device, proximity sensor, etc. A master device may be any electronic device capable of collecting data, e.g., mobile phone, smart phone, personal digital assistant, personal computer, laptop computer, tablet computer, etc.

Packets sent from a slave device in advertising mode may contain approximately 28 bytes of data and a slave address. Packets from a master device in advertisement channel may contain scanner and advertiser addresses. According to an embodiment, the packets from a master device in advertisement channel contains only a master address. Further information on BLE operations and communications may be found, for example, in United States Patent Application Publication No. 2014/0321321; United States Patent Application Publication No. 2015/0319600; and United States Patent Application Publication No. 2015/0271628, each of which is incorporated herein by reference in its entirety for all purposes.

Embodiments of the disclosed systems and methods may implement BLE wireless communication according to one or more BLE specifications such as Bluetooth 4.x (e.g., Bluetooth 4.0, 4.1, 4.2) core version specifications, Bluetooth 5 core version specification, addendums and supplements thereto, etc. that are available from the Bluetooth Special Interest Group (SIG). However, it will be understood that the above described BLE embodiments are exemplary only, and that the systems and methods described in relation to FIGS. 1-6 may be implemented for non-BLE wireless protocol communication, and/or may be implemented to transmit packets other than BLE packets between two BLE wireless devices.

It will also be understood that one or more of the tasks, functions, or methodologies described herein for a radio module or radio device (e.g., including those described herein for module segment 110 and module segment 120 of FIG. 1 including CPU 150, BLE controller 230 (e.g., baseband 234), DEC/DAC 293, amplifier circuitry 295, switch 195, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed on a processing device or programmed circuitry in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodologies disclosed herein. It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

Further, while the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method, comprising:
   receiving a radio frequency (RF) signal at a first device, the RF signal being transmitted from a second device;
   measuring one or more RF signal reception or transmission characteristics of the received signal at the first device to determine at least one of position, orientation and/or direction of the first device relative to the second device;
   determining an operating mode for at least one of the first device or second device based on the determined position, orientation and/or direction of the first device relative to the second device by:
      assigning at least one channel of a RF audio signal to at least one speaker of the first device or second device based on the determined position, orientation and/or direction of the first device relative to the second device, or
      assigning at least one of color, intensity and/or blinking pattern for emission from at least one light source of the first or second device based on the determined position, orientation and/or direction of the first device relative to the second device; and
   implementing the determined operating mode by controlling operation of at least one of the first device or second device to implement the determined operating mode by:
      causing analog audio reproduction of acoustic sound waves from data of the assigned audio channel of the RF signal by the at least one speaker of the first device or second device, or
      causing emission of light having the assigned color, intensity and/or blinking pattern from the at least one light source of the first or second device.

2. The method of claim 1, where at least one of the first device or second device comprises non-radio circuitry and/or non-radio-hardware; where the operating mode is a non-radio operating mode; and where the step of implementing the determined non-radio operating mode comprises controlling operation of the non-radio circuitry and/or non-radio hardware to implement the determined non-radio operating mode.

3. The method of claim 1 where the step of determining the operating mode for at least one of the first device or second device based on the determined position, orientation and/or direction of the first device relative to the second device comprises assigning at least one of color, intensity and/or blinking pattern for emission from the at least one light source of the first or second device based on the determined position, orientation and/or direction of the first device relative to the second device; and where the step of implementing the determined operating mode by controlling operation of at least one of the first device or second device to implement the determined operating mode comprises causing emission of light having the assigned color, intensity and/or blinking pattern from the at least one light source of the first or second device.

4. The method of claim 1, where the one or more RF signal reception or transmission characteristics of the received signal comprise at least one of time of arrival (TOA) of the received signal at the first device, Angle of Arrival (AoA) of the received signal at the first device, Angle of Departure (AoD) of the received signal from the second device, and measured received signal strength of the received signal received at the first device.

5. The method of claim 1, further comprising transmitting a multi-channel RF audio signal from the first device to be received by the second device or transmitting a multi-channel RF audio signal from the second device to be received by the first device; where the step of determining the operating mode comprises assigning one audio channel of the multi-channel RF audio signal for analog audio reproduction by at least one speaker of the first device when it receives the multi-channel RF audio signal or by at least one speaker of the second device when it receives the multi-channel RF audio signal based on the determined position, orientation and/or direction of the first device relative to the second device; and where the step of implementing the determined operating mode comprises controlling circuitry of the first device when it receives the multi-channel RF audio signal to cause analog audio reproduction of acoustic sound waves from data of the assigned audio channel by the assigned speaker of the first device, or controlling circuitry of the second device when it receives the multi-channel RF audio signal to cause analog audio reproduction of acoustic sound waves from data of the assigned audio channel by the assigned speaker of the second device.

6. The method of claim 1, where the RF signal received at the first device from the second device comprises a multi-channel RF audio signal that comprises multiple audio channels; where the first device comprises circuitry coupled to at least one speaker; and where the method further comprises:

measuring one or more RF signal reception characteristics of the received multi-channel RF audio signal at the first device to determine at least one of position, orientation and/or direction of the first device relative to the second device;

determining an operating mode for the first device by assigning one channel of the multi-channel RF audio signal for analog audio reproduction by the at least one speaker and not assigning at least one other channel of the multi-channel RF audio signal for analog audio reproduction by the at least one speaker based on the determined position, orientation and/or direction of the first device relative to the second device; and implementing the determined operating mode by controlling circuitry of the receiving first device to cause analog audio reproduction of acoustic sound waves from data of the assigned audio channel by the at least one speaker and to not cause audio reproduction of acoustic sound waves from data of at least one other audio channel of the multi-channel RF audio signal by the at least one speaker.

7. The method of claim 6, where the one or more RF signal reception characteristics of the received multi-channel RF audio signal comprises at least one of Time Difference of Arrival (TDOA) of the multi-channel RF audio signal received at separate antenna elements of an antenna array of the first device, Angle of Arrival (AoA) of the multi-channel RF audio signal received at an antenna array of the first device, or measured received signal strength received at different antenna elements of an antenna array of the first device.

8. The method of claim 1, where the RF signal received at the first device from the second device comprises a multi-channel RF audio signal that comprises multiple audio channels; where the first device comprises circuitry coupled to multiple different speakers; and where the method further comprises:

measuring one or more RF signal reception characteristics of the received multi-channel RF audio signal at the first device to determine at least one of position, orientation and/or direction of the first device relative to the second device;

determining an operating mode for the first device by assigning a first audio channel of the multi-channel RF audio signal for analog audio reproduction by a first one of the multiple different speakers of the first device based on the determined position, orientation and/or direction of the first device relative to the second device, and assigning a second audio channel of the multi-channel RF audio signal for analog audio reproduction by a second one of the multiple different speakers of the first device based on the determined position, orientation and/or direction of the second device relative to the second device; and implementing the determined operating mode by controlling the circuitry of the receiving first device to cause analog audio reproduction of acoustic sound waves from data of the assigned first audio channel by the first one of the multiple different speakers of the first device and not by the second one of the multiple different speakers of the first device, and at the same time to cause to cause analog audio reproduction of acoustic sound waves from data of the assigned second audio channel by the second one of the multiple different speakers of the first device and not by the first one of the multiple different speakers of the first device.

9. The method of claim 8, where the one or more RF signal reception characteristics of the received multi-channel RF audio signal comprises at least one of Time Difference of Arrival (TDOA) of the multi-channel RF audio signal received at separate antenna elements of an antenna array of the first device, Angle of Arrival (AoA) of the multi-channel RF audio signal received at an antenna array of the first device, or measured received signal strength received at different antenna elements of an antenna array of the first device.

10. The method of claim 1, where the RF signal received at the first device from the second device comprises a first RF signal; where the second device comprises at least one speaker; and where the method further comprises:

measuring one or more RF signal transmission characteristics of the received first signal at the first device to determine at least one of position, orientation and/or direction of the first device relative to the second device;

transmitting a second RF signal from the first device to the second device, the second RF signal comprising a multi-channel RF audio signal that comprises multiple audio channels;

determining an operating mode for the second device by assigning one channel of the transmitted multi-channel RF audio signal for analog audio reproduction by the at least one speaker of the second device and not assigning another channel of the multi-channel RF audio signal for analog audio reproduction by the at least one speaker of the second device based on the determined position, orientation and/or direction of the first device relative to the second device; and implementing the determined operating mode by transmitting the second RF signal from the first device to the second device to control the second device to cause analog audio reproduction of acoustic sound waves from data of the assigned audio channel by the at least one speaker of the second device.

11. The method of claim 10, where the second RF signal further comprises information identifying the channel of the transmitted multi-channel RF audio signal assigned for analog audio reproduction by the at least one speaker of the second device.

12. The method of claim 10, where the one or more RF signal transmission characteristics of the received first signal comprises Angle of Departure (AoD) of the first signal as transmitted from an antenna array of the second device.

13. The method of claim 1, where the first device or second device comprises an audio headphone or hearing aid system worn on the head of a user, the headphone or hearing aid system comprising a first headphone or hearing aid having an integrated first speaker worn adjacent one ear of a user, and a second headphone or hearing aid having an integrated second speaker worn adjacent the other ear of the user; and where the step of determining an operating mode comprises assigning a first channel of a multi-channel RF audio signal received by the headphone or hearing aid system to the first speaker and assigning a different second channel of the multi-channel RF audio signal to the second speaker based on the determined position, orientation and/or direction of the first device relative to the second device, and implementing the determined operating mode by controlling operation of the headphone or hearing aid system to implement the determined operating mode by causing analog audio reproduction of acoustic sound waves from data of the first audio channel by the first speaker and not by the second speaker, and causing analog audio reproduction of acoustic sound waves from data of the second audio channel by the second speaker and not by the first speaker.

14. The method of claim 1, where the first device or second device comprises a loudspeaker system having a speaker; and where the step of determining an operating mode comprises assigning one channel of a multi-channel RF audio signal received by the loudspeaker system to the speaker and not assigning another channel of the multi-channel RF audio signal to the speaker based on the determined position, orientation and/or direction of the first device relative to the second device, and implementing the determined operating mode by controlling operation of the loudspeaker system to implement the determined operating mode by causing analog audio reproduction of acoustic sound waves from data of the assigned audio channel by the speaker of the loudspeaker system.

15. An apparatus, comprising at least one programmable integrated circuit coupled to radio circuitry of a first device, the programmable integrated circuit being programmed to operate the first device to:
receive a radio frequency (RF) signal at the first device, the RF signal being transmitted from a second device;
measure one or more RF signal reception or transmission characteristics of the received signal at the first device to determine at least one of position, orientation and/or direction of the first device relative to the second device;
determine an operating mode for at least one of the first device or second device based on the determined position, orientation and/or direction of the first device relative to the second device by:
  assigning at least one channel of a RF audio signal to at least one speaker of the first device or second device based on the determined position, orientation and/or direction of the first device relative to the second device, or
  assigning at least one of color, intensity and/or blinking pattern for emission from at least one light source of the first or second device based on the determined position, orientation and/or direction of the first device relative to the second device; and
implement the determined operating mode by controlling operation of the first device to implement the determined operating mode and/or transmitting a RF signal to the second device to cause the second device to implement the determined operating mode by:
  causing analog audio reproduction of acoustic sound waves from data of the assigned audio channel of the RF signal by the at least one speaker of the first device or second device, or
  causing emission of light having the assigned color, intensity and/or blinking pattern from the at least one light source of the first or second device.

16. The apparatus of claim 15, where at least one of the first device or second device is coupled to non-radio circuitry and/or non-radio-hardware; where the operating mode is a non-radio operating mode; and where the programmable integrated circuit is programmed to implement the determined non-radio operating mode by controlling operation of the non-radio circuitry and/or non-radio hardware for the first device to implement the determined non-radio operating mode and/or transmitting a RF signal to the second device to cause the non-radio circuitry and/or non-radio hardware for the second device to implement the determined non-radio operating mode.

17. The apparatus of claim 16, where the programmable integrated circuit is programmed to operate the first device to:
determine the operating mode for at least one of the first device or second device based on the determined position, orientation and/or direction of the first device relative to the second device by assigning at least one of color, intensity and/or blinking pattern for emission from at least one light source of the first or second device based on the determined position, orientation and/or direction of the first device relative to the second device; and
implement the determined operating mode by controlling operation of the first device to implement the determined operating mode and/or transmitting a RF signal to the second device to cause the second device to implement the determined operating mode by causing emission of light having the assigned color, intensity and/or blinking pattern from the at least one light source of the first or second device.

18. The apparatus of claim 15, where the one or more RF signal reception or transmission characteristics of the received signal comprise at least one of time of arrival (TOA) of the received signal at the first device, Angle of Arrival (AoA) of the received signal at the first device, Angle of Departure (AoD) of the received signal from the second device, and measured received signal strength of the received signal received at the first device.

19. The apparatus of claim 15, where the RF signal received at the first device from the second device comprises a multi-channel RF audio signal that comprises multiple audio channels; where the first device comprises circuitry coupled to at least one speaker; and where the programmable integrated circuit is programmed to operate the first device to:
measure one or more RF signal reception characteristics of the received multi-channel RF audio signal at the first device to determine at least one of position, orientation and/or direction of the first device relative to the second device;
determine an operating mode for the first device by assigning one channel of the multi-channel RF audio signal for analog audio reproduction by the at least one speaker and not assigning at least one other channel of the multi-channel RF audio signal for analog audio reproduction by the at least one speaker based on the determined position, orientation and/or direction of the first device relative to the second device; and
implement the determined operating mode by controlling circuitry of the receiving first device to cause analog audio reproduction of acoustic sound waves from data of the assigned audio channel by the at least one speaker and to not cause audio reproduction of acoustic sound waves from data of at least one other audio channel of the multi-channel RF audio signal by the at least one speaker.

20. The apparatus of claim 19, where the one or more RF signal reception characteristics of the received multi-channel RF audio signal comprises at least one of Time Difference of Arrival (TDOA) of the multi-channel RF audio signal received at separate antenna elements of an antenna array of the first device, Angle of Arrival (AoA) of the multi-channel RF audio signal received at an antenna array of the first device, or measured received signal strength received at different antenna elements of an antenna array of the first device.

21. The apparatus of claim 15, where the RF signal received at the first device from the second device comprises a multi-channel RF audio signal that comprises multiple audio channels; where the first device comprises circuitry coupled to multiple different speakers; and where the programmable integrated circuit is programmed to operate the first device to:
  measure one or more RF signal reception characteristics of the received multi-channel RF audio signal at the first device to determine at least one of position, orientation and/or direction of the first device relative to the second device;
  determine an operating mode for the first device by assigning a first audio channel of the multi-channel RF audio signal for analog audio reproduction by a first one of the multiple different speakers of the first device based on the determined position, orientation and/or direction of the first device relative to the second device, and assigning a second audio channel of the multi-channel RF audio signal for analog audio reproduction by a second one of the multiple different speakers of the first device based on the determined position, orientation and/or direction of the second device relative to the second device; and
  implement the determined operating mode by controlling circuitry of the receiving first device to cause analog audio reproduction of acoustic sound waves from data of the assigned first audio channel by the first one of the multiple different speakers of the first device and not by the second one of the multiple different speakers of the first device, and at the same time to cause to cause analog audio reproduction of acoustic sound waves from data of the assigned second audio channel by the second one of the multiple different speakers of the first device and not by the first one of the multiple different speakers of the first device.

22. A system, comprising:
  a first device having at least one first programmable integrated circuit coupled to radio circuitry of the first device;
  a second device having at least one second programmable integrated circuit coupled to radio circuitry of the second device;
  where the second programmable integrated circuit of the second device is programmed to control operation of the second device to transmit a first RF signal from the second device to the first device; and
  where the first programmable integrated circuit of the first device is programmed to operate the first device to:
    receive the first RF signal at the first device,
    measure one or more RF signal reception or transmission characteristics of the received first RF signal at the first device to determine at least one of position, orientation and/or direction of the first device relative to the second device,
    determine an operating mode for at least one of the first device or second device based on the determined position, orientation and/or direction of the first device relative to the second device by: assigning at least one channel of a RF audio signal to at least one speaker of the first device or second device based on the determined position, orientation and/or direction of the first device relative to the second device, or by assigning at least one of color, intensity and/or blinking pattern for emission from at least one light source of the first or second device based on the determined position, orientation and/or direction of the first device relative to the second device, and
    implement the determined operating mode by controlling operation of the first device to implement the determined operating mode and/or transmitting a second RF signal from the first device to the second device to cause the second device to implement the determined operating mode by: causing analog audio reproduction of acoustic sound waves from data of the assigned audio channel of the RF signal by the at least one speaker of the first device or second device, or by causing emission of light having the assigned color, intensity and/or blinking pattern from the at least one light source of the first or second device.

23. The system of claim 22, where the one or more RF signal reception or transmission characteristics of the received signal comprise at least one of time of arrival (TOA) of the received signal at the first device, Angle of Arrival (AoA) of the received signal at the first device, Angle of Departure (AoD) of the received signal from the second device, and measured received signal strength of the received signal received at the first device.

24. The system of claim 22, where the first RF signal is a multi-channel RF audio signal; and where the first programmable integrated circuit of the first device is programmed to operate the first device to:
  assign one audio channel of the multi-channel RF audio signal for analog audio reproduction by at least one speaker of the first device when it receives the multi-channel RF audio signal; and
  implement the determined operating mode by controlling circuitry of the first device to cause analog audio reproduction of acoustic sound waves from data of the assigned audio channel by the assigned speaker of the first device and to not cause audio reproduction of acoustic sound waves from data of at least one other audio channel of the multi-channel RF audio signal by the at least one speaker.

25. The system of claim 22, where the RF signal received at the first device from the second device comprises a first RF signal; where the second device further comprises circuitry coupled to at least one speaker; and where the first programmable integrated circuit of the first device is programmed to operate the first device to:
  measure one or more RF signal transmission characteristics of the received first RF signal at the first device to determine at least one of position, orientation and/or direction of the first device relative to the second device;
  transmit the second RF signal from the first device to the second device, the second RF signal comprising a multi-channel RF audio signal that comprises multiple audio channels;
  determine an operating mode for the second device by assigning one channel of the transmitted multi-channel RF audio signal for analog audio reproduction by the at least one speaker of the second device and not assigning another channel of the multi-channel RF audio signal for analog audio reproduction by the at least one speaker of the second device based on the determined position, orientation and/or direction of the first device relative to the second device, the transmitted multi-channel RF audio signal further comprising information identifying the channel of the transmitted multichannel RF audio signal assigned for analog audio reproduction by the at least one speaker of the second device; and where the second programmable integrated circuit of the second device is programmed to operate the second device to:
receive the multi-channel RF audio signal at the second device, and
implement the determined operating mode by controlling the circuitry of the second device to cause analog audio reproduction of acoustic sound waves from data of the assigned audio channel by the at least one speaker of the second device and not to cause analog audio reproduction of acoustic sound waves from data of the not assigned audio channel by the at least one speaker of the second device based on the information identifying the channel of the transmitted multi-channel RF audio signal assigned for analog audio reproduction by the at least one speaker of the second device.

26. The system of claim 25, where the one or more RF signal transmission characteristics of the received first signal comprises Angle of Departure (AoD) of the first signal as transmitted from an antenna array of the second device.

27. The system of claim 22, where the first programmable integrated circuit of the first device is programmed to operate the first device to:
determine the operating mode for at least one of the first device or second device based on the determined position, orientation and/or direction of the first device relative to the second device by assigning at least one of color, intensity and/or blinking pattern for emission from at least one light source of the first or second device based on the determined position, orientation and/or direction of the first device relative to the second device; and
implement the determined operating mode by controlling operation of the first device to implement the determined operating mode and/or transmitting a second RF signal from the first device to the second device to cause the second device to implement the determined operating mode by: causing emission of light having the assigned color, intensity and/or blinking pattern from the at least one light source of the first or second device.

* * * * *